(12) United States Patent
Kano et al.

(10) Patent No.: US 6,810,032 B2
(45) Date of Patent: Oct. 26, 2004

(54) NETWORK CONTROL APPARATUS FOR CONTROLLING DEVICES COMPOSING COMUNICATION NETWORK INCLUDING THE APPARATUS

(75) Inventors: Shinya Kano, Kawasaki (JP); Shunsuke Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 675 days.

(21) Appl. No.: 09/747,963

(22) Filed: Dec. 26, 2000

(65) Prior Publication Data
US 2002/0089969 A1 Jul. 11, 2002

(51) Int. Cl.[7] ............................................... H04L 12/28
(52) U.S. Cl. ...................... 370/351; 370/256; 370/422; 709/244; 709/252
(58) Field of Search ................................. 370/524, 255, 370/256, 351, 389, 392, 395.1, 398, 422, 423, 424, 425; 709/238, 244, 252

(56) References Cited

U.S. PATENT DOCUMENTS

| | | | | |
|---|---|---|---|---|
| 5,519,707 A | * | 5/1996 | Subramanian et al. | 370/399 |
| 5,583,860 A | * | 12/1996 | Iwakawa et al. | 370/232 |
| 6,201,810 B1 | * | 3/2001 | Masuda et al. | 370/395.32 |
| 6,226,263 B1 | * | 5/2001 | Masuda et al. | 370/232 |
| 6,542,468 B1 | * | 4/2003 | Hatakeyama | 370/238 |

* cited by examiner

*Primary Examiner*—Bob A. Phunkulh
(74) *Attorney, Agent, or Firm*—Katten Muchin Zavis Rosenman

(57) ABSTRACT

A network control apparatus for controlling devices in a predetermined area of a communication network includes a request-receiving unit for receiving a first route-setting request, a database for storing device information and topology information, a request-range-judging unit for forming a judgment as to whether or not the first route-setting request is relevant to any of the controlled devices, and a request-transmitting unit for transmitting the first route-setting request to an upper-level network control apparatus in the case of the request-range-judging unit's judgment outcome indicating that the first route-setting request is irrelevant to any of the controlled devices.

10 Claims, 39 Drawing Sheets

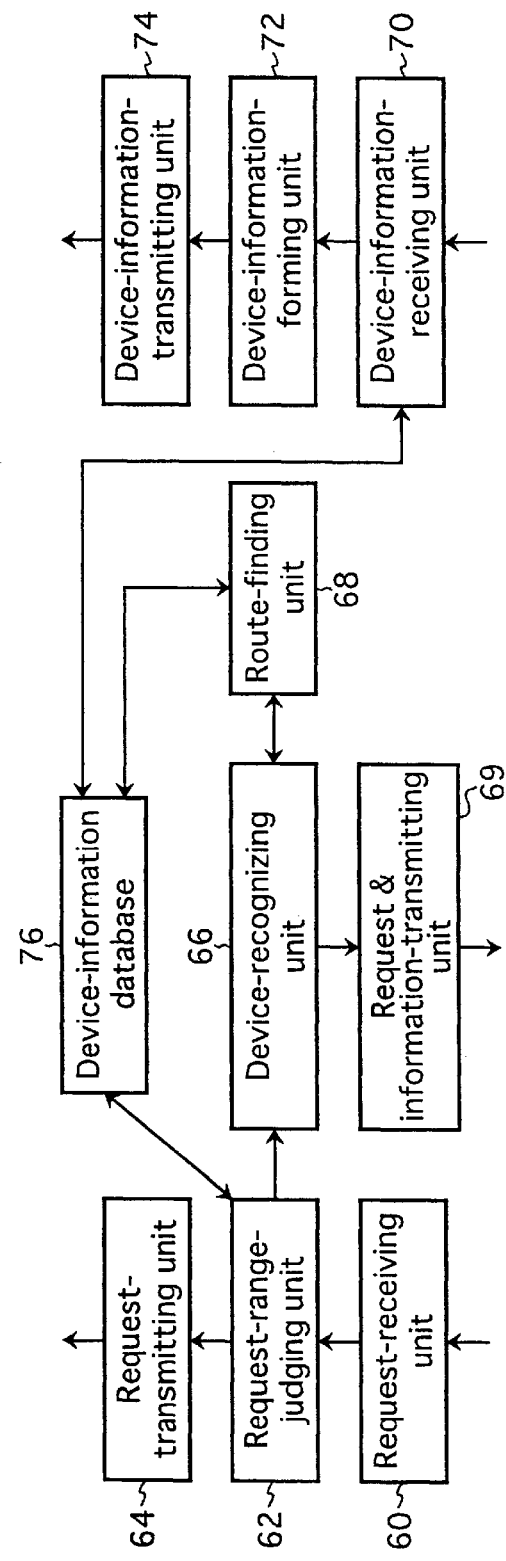
F I G. 5

FIG. 6

| Route start-point address |
|---|
| Route end-point address |
| Communication destination address |
| Requested bandwidth |

FIG. 7

| Communication transmission source address |
|---|
| Communication destination address |
| Communication destination address |
| Requested bandwidth |

FIG. 8

| |
|---|
| Address of entrance relay apparatus of this area (Or transmission source address) |
| Address of entrance relay apparatus of next area (Or transmission destination address) |
| Communication destination address |
| Requested bandwidth |

FIG. 9

| |
|---|
| Address of relay apparatus |
| Address of next relay apparatus |
| Communication destination address |
| Requested bandwidth |

FIG. 10

| Node address #A |
|---|
| Adjacent-node address 1 |
| Link bandwidth 1 |
| Adjacent-node address 1 |
| Link bandwidth 1 |
| . . . |
| Adjacent-node address N |
| Link bandwidth N |
| Node address #B |
| Adjacent-node address 1 |
| Link bandwidth 1 |
| Adjacent-node address 1 |
| Link bandwidth 1 |
| . . . |
| Adjacent-node address N |
| Link bandwidth N |
| Node address #C |
| . . . |

FIG. 11

| Address #1 |
|---|
| Address #2 |
| Address #3 |
| Address #4 |
| Address #5 |
| ... |

FIG. 12

| Area ID #1 |
|---|
| Node address #1 1 |
| ... |
| Area ID #n |
| Node address #n1 |
| ... |
| Area ID #nm |

FIG. 17

| |
|---|
| Node address of relay apparatus 50#13 |
| Node address of relay apparatus 50#15 |
| 100Mb/s |
| Node address of relay apparatus 50#14 |
| 10Mb/s |
| Node address of relay apparatus 50#14 |
| Node address of relay apparatus 50#13 |
| 10Mb/s |
| Node address of relay apparatus 50#15 |
| 30Mb/s |
| Node address of relay apparatus 50#15 |
| Node address of relay apparatus 50#13 |
| 100Mb/s |
| Node address of relay apparatus 50#14 |
| 30Mb/s |

FIG. 20

| |
|---|
| Node address of relay apparatus 50#13 |
| Node address of relay apparatus 50#15 |
| 100Mb/s |
| Node address of relay apparatus 50#14 |
| 50Mb/s |
| Node address of relay apparatus 50#14 |
| Node address of relay apparatus 50#13 |
| 50Mb/s |
| Node address of relay apparatus 50#15 |
| 50Mb/s |
| Node address of relay apparatus 50#15 |
| Node address of relay apparatus 50#13 |
| 100Mb/s |
| Node address of relay apparatus 50#14 |
| 50Mb/s |

FIG. 29

Route-setting request(1):(Address of terminal 49#111, address of terminal 49#531, bandwidth of 10 Mb/s)
Route-setting request(2):(Address of terminal 49#111, address of terminal 49#531, bandwidth of 10 Mb/s)
Route-setting request(3):(Address of terminal 49#111, address of terminal 49#531, bandwidth of 10 Mb/s)
Route-setting request(4):(Address of terminal 49#111, address of terminal 49#531, bandwidth of 10 Mb/s)
Route-setting request(5):(Address of relay apparatus 50#51, address of terminal 49#531, bandwidth of 10 Mb/s)
Route-setting request(6):(Address of terminal 49#111, address of relay apparatus 50#21, address of terminal 49#531, bandwidth of 10 Mb/s)
Route-setting request(7):(Address of relay apparatus 50#21, address of relay apparatus 50#41, address of terminal 49#531, bandwidth of 10 Mb/s)
Route-setting request(8):(Address of relay apparatus 50#21, address of relay apparatus 50#51, address of terminal 49#531, bandwidth of 10 Mb/s)
Route-setting request(9):(Address of relay apparatus 50#51, address of terminal 49#531, bandwidth of 10 Mb/s)
Device-setting Information(10):(Address of relay apparatus 50#11, address of terminal 49#13, address of terminal 49#531, bandwidth of 10 Mb/s)
Device-setting Information(11):(Address of relay apparatus 50#13, address of relay apparatus 50#21, address of terminal 49#531, bandwidth of 10 Mb/s)
Device-setting Information(12):(Address of relay apparatus 50#21, address of relay apparatus 50#22, address of terminal 49#531, bandwidth of 10 Mb/s)
Device-setting Information(13):(Address of relay apparatus 50#22, address of relay apparatus 50#24, address of terminal 49#531, bandwidth of 10 Mb/s)
Device-setting Information(14):(Address of relay apparatus 50#24, address of relay apparatus 50#41, address of terminal 49#531, bandwidth of 10 Mb/s)
Device-setting Information(15):(Address of relay apparatus 50#41, address of relay apparatus 50#43, address of terminal 49#531, bandwidth of 10 Mb/s)
Device-setting Information(16):(Address of relay apparatus 50#43, address of relay apparatus 50#44, address of terminal 49#531, bandwidth of 10 Mb/s)
Device-setting Information(17):(Address of relay apparatus 50#44, address of relay apparatus 50#45, address of terminal 49#531, bandwidth of 10 Mb/s)
Device-setting Information(18):(Address of relay apparatus 50#45, address of relay apparatus 50#51, address of terminal 49#531, bandwidth of 10 Mb/s)
Device-setting Information(19):(Address of relay apparatus 50#51, address of relay apparatus 50#53, address of terminal 49#531, bandwidth of 10 Mb/s)
Device-setting Information(20):(Address of relay apparatus 50#53, address of terminal 49#531, address of terminal 49#531, bandwidth of 10 Mb/s)

FIG. 33

| Communication identification flag |
|---|
| Communication transmission source address |
| Communication destination address |
| Communication destination address |
| Requested bandwidth |

A communication identification flag of 1 indicates
that the request was received from
an upper-level network control apparatus whereas
that the request was received from devices
other than the upper-level network control apparatus.

FIG. 36

| |
|---|
| Transmission-source address |
| Transmission-destination address |
| Address of relay apparatus #1 |
| Address of relay apparatus #2 |
| Set bandwidth #1 |
| ⋮ |
| Address of relay apparatus #(n-1) |
| Address of relay apparatus #n |
| Set bandwidth #(n-1) |
| ⋮ |
| Transmission-source address |
| Transmission-destination address |
| ⋮ |

Information on routes set on 1 route-setting request

F I G. 39

| Address of relay apparatus |
| --- |
| State of traffic through relay apparatus or state of failure in relay apparatus |

NETWORK CONTROL APPARATUS FOR CONTROLLING DEVICES COMPOSING COMUNICATION NETWORK INCLUDING THE APPARATUS

BACKGROUND OF THE INVENTION

1. Field of the Invention

The present invention relates to a network control apparatus for controlling devices composing a communication network by, for example, setting routes and managing congestions and failures in the communication network, and relates to the communication network, which includes the apparatus.

2. Description of the Related Art

A communication network comprises a plurality of communication terminals, a plurality of relay apparatuses, transmission lines each connecting a relay apparatus to a communication terminal and transmission lines each connecting a relay apparatus to another relay apparatus. For example, the Internet, which becomes popular very fast, comprises personal computers (PCs) and workstations (WS') each serving as a communication terminal, relay apparatuses such as routers and transmission lines such as optical fibers. Normally, in a communication between communication terminals, a route with a required bandwidth guaranteed between relay apparatuses connected to the communication terminals is set prior to the communication. It is also necessary to preserve a high communication quality by avoiding congestions and failures. In the conventional communication network, routes are set, and the communication quality is managed by a network management apparatus.

FIG. 43 is a diagram showing a typical configuration of the conventional communication network. As shown in FIG. 43, the conventional communication network comprises a plurality of communication terminals 2#1 and 2#2, a plurality of relay apparatuses 4#1 to 4#3 and a network control apparatus 6. The network control apparatus 6 gathers topology information showing a link state from each of devices on the communication network such as the relay apparatuses 4#i where i=1 to 3 and the communication terminals 2#i where i=1 to 2 by way of the Internet or dedicated lines. The network control apparatus 6 stores the topology information in a device-information database. The network control apparatus 6 receives a request for setting of routes from an external device such as a relay apparatus 4#i where i=1 to 3 or a communication terminal 2#i where i=1 to 2. For example, the network control apparatus 6 is requested to set routes at a bandwidth of 10 Mb/s between the communication apparatuses 2#1 and 2#2.

The network control apparatus 6 interprets information included in the request for setting of routes, and identifies devices on the routes being set to create device-setting information for the devices. When the network control apparatus 6 receives a request for setting of routes from a specific relay apparatus prior to communication of data destined for the communication terminal 2#2, for example, the network control apparatus 6 creates device-setting information indicating a relay apparatus to be used for relaying the communicated data and a bandwidth to be guaranteed, transmitting the information to the specific relay apparatus. The specific relay apparatus guarantees the specified bandwidth to be used between the specific relay apparatus and the relay apparatus specified in the device-setting information and transmits the communicated data to the relay apparatus specified in the information in accordance with the information. With the rapid growth of the communication network, however, the scale of the communication network becomes large and, if the number of relay apparatuses controlled by the network control apparatus rises, the following problems are raised.

1: The amount of communication network information stored in the device-information database increases substantially.
2: A load of processing to find an optimum route becomes large, because the number of relay apparatuses identified in a process of finding a route increases.
3: A load of connection management processing becomes large, because the number of relay-apparatus linked connections increases.

SUMMARY OF THE INVENTION

It is thus an object of the present invention addressing the problems described above to provide a network control apparatus that does not cause the amount of communication network information to rise even if the scale of the communication network becomes large.

It is another object of the present invention to provide a network control apparatus that does not cause a load of processing to find an optimum route to rise even if the scale of the communication network becomes large.

It is a further object of the present invention to provide a network control apparatus that does not cause the number of relay-apparatus linked connections to rise even if the scale of the communication network becomes large.

In accordance with an aspect of the present invention, there is provided a network control apparatus for controlling specific ones among a plurality of devices in a communication network divided into a plurality of areas wherein the specific devices are located in a predetermined one among the areas, the network control apparatus comprising: request-receiving means for receiving a first route-setting request requesting setting of a route between a device serving as a transmission destination and a device serving as a transmission source receiving communicated data from one of the devices; a database for storing device information identifying the controlled specific devices located in the predetermined area and topology information indicating a link of each of the specific devices to devices adjacent to the specific device; request-range-judging means for searching the database for a device serving as a transmission source and a device serving as a transmission destination specified in the first route-setting request and forming a judgment as to whether or not the first route-setting request is relevant to any of the controlled specific devices by determining whether the device serving as transmission source and the device serving as a transmission destination are among the controlled specific devices; request-transmitting means for transmitting the first route-setting request to an upper-level network control apparatus controlling the network control apparatus in the case of the request-range-judging means' judgment outcome indicating that the first route-setting request is irrelevant to any of the controlled specific devices; route-finding means for finding a route between the device serving as a transmission destination and the device serving as a transmission source on the basis of the first route-setting request and the topology information in the case of the request-range-judging means' judgment outcome indicating that the first route-setting request is relevant to any of the controlled specific devices; device-recognizing means for creating a device-setting request relevant to the route found by the request-range-judging means for each device on the route or for each lower-level network control apparatus controlling one of the areas passed through by the route; and request & information-transmitting means for transmitting the device-setting request to each device on the route or each lower-level network control apparatus controlling one of the areas passed through by the route.

In accordance with another aspect of the present invention, there is provided a communication network: comprising a plurality of communication terminals, a plurality of relay apparatuses and a plurality of network control apparatuses; and treating each of the communication terminals, the relay apparatuses and the network control apparatuses like a device, wherein the network control apparatuses form a multi-branch tree structure in which: each of the network control apparatuses at the lowest level of the multi-branch tree structure controls a plurality of the communication terminals and a plurality of the relay apparatuses located in a predetermined one of a plurality of first areas composing the communication network; and each of the other network control apparatuses controls a plurality of the communication terminals and a plurality of the relay apparatuses located in a second area comprising some of the first areas each controlled by one of the network control apparatuses at the lowest level.

In the communication network according to the other aspect of the present invention, each of the network control apparatuses comprises: request-receiving means for receiving a first route-setting request requesting setting of a route between a device serving as a transmission destination and a device serving as a transmission source receiving communicated data from one of the devices; a database for storing device information identifying the controlled specific devices located in the predetermined area and topology information indicating a link of each of the specific devices to devices adjacent to the specific device; request-range-judging means for searching the database for a device serving as a transmission source and a device serving as a transmission destination specified in the first route-setting request and forming a judgment as to whether or not the first route-setting request is relevant to any of the controlled specific devices by determining whether the device serving as transmission source and the device serving as a transmission destination are among the controlled specific devices; request-transmitting means for transmitting the first route-setting request to an upper-level network control apparatus controlling the network control apparatus in the case of the request-range-judging means' judgment outcome indicating that the first route-setting request is irrelevant to any of the controlled specific devices; route-finding means for finding a route between the device serving as a transmission destination and the device serving as a transmission source on the basis of the first route-setting request and the topology information in the case of the request-range-judging means' judgment outcome indicating that the first route-setting request is relevant to any of the controlled specific devices; device-recognizing means for creating a device-setting request relevant to the route found by the request-range-judging means for each device on the route or for each lower-level network control apparatus controlling one of the areas passed through by the route; and request & information-transmitting means for transmitting the device-setting request to each device on the route or each lower-level network control apparatus controlling one of the areas passed through by the route.

The above and other objects, features and advantages of the present invention as well as the manner of realizing them will become more apparent, whereas the invention itself will be best understood from a study of the following description and appended claims with reference to the attached drawings showing some preferred embodiments of the invention.

BRIEF DESCRIPTION OF THE DRAWINGS

FIG. 5 is a functional block diagram showing a network control apparatus implemented by a first embodiment of the present invention;

FIG. 6 is a diagram showing the basic format of a request for setting of routes;

FIG. 7 is a diagram showing the format of a request for setting of routes received from a communication terminal, a console, a relay apparatus or a lower-level network control apparatus;

FIG. 8 is a diagram showing the format of a request for setting of routes received from an upper-level network control apparatus;

FIG. 9 is a diagram showing the format of device-setting information transmitted to a relay apparatus;

FIG. 10 is a diagram showing the format of first communication network information;

FIG. 11 is a diagram showing the format of second communication network information;

FIG. 12 is a diagram showing a device-list file stored in a device-information database employed in the network control apparatus shown in FIG. 5;

FIG. 17 is a diagram showing first communication network information produced by the first bandwidth determination method;

FIG. 20 is a diagram showing first communication network information produced by the second bandwidth determination method;

FIG. 29 is a sequence chart of the second case in which the address of a start point is the address of a device in its area but the address of an end point is not the address of a device in its area;

FIG. 33 is a diagram showing the basic format of a request for setting of routes;

FIG. 36 is a diagram showing the configuration of a route-management sub-database in a device-information database employed in the network control apparatus shown in FIG. 35;

FIG. 39 is a diagram showing the format of third network information;

DETAILED DESCRIPTION OF THE PREFERRED EMBODIMENTS

Figure 1:
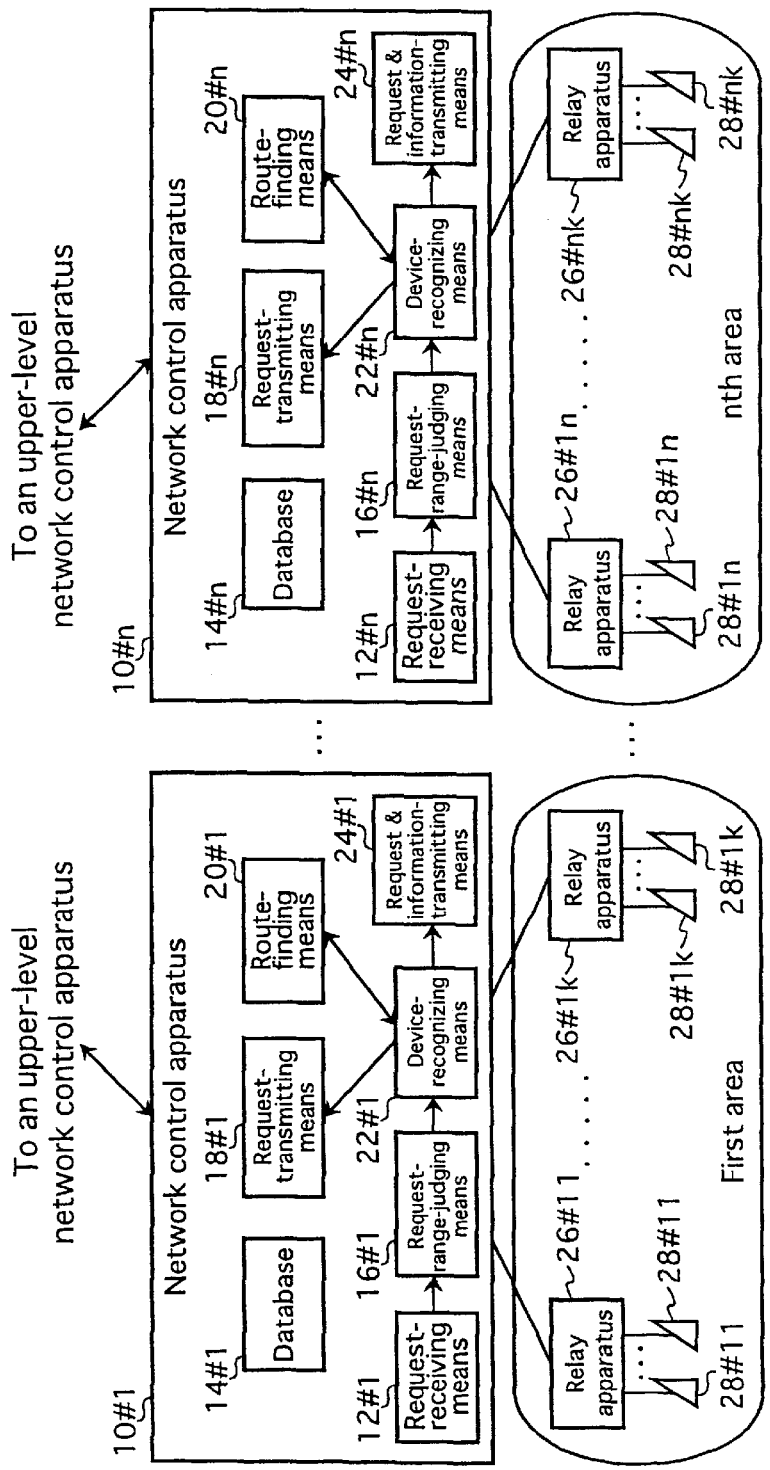
FIG. 1 is a diagram showing the principle of the present invention.

Before explaining some preferred embodiments of the present invention, the principle of the invention is described. FIG. 1 is a diagram showing the principle of the present invention. A communication network is divided into a plurality of areas i where i=1 to n. A plurality of relay apparatuses 26#ij where j=1 to k and a plurality of communication terminals 28#ij connected to each of the relay apparatuses 26#ij are located in each of the areas i where i=1 to n. A network control apparatus 10#i controls the relay apparatuses 26#ij where j=1 to k and the communication terminals 28#ij connected to each of the relay apparatuses 26#ij, which are located in the area i. The network control apparatus 10#i comprises a request-receiving unit 12#i, a database 14#i, request-range-judging means 16#i, a request-transmitting unit 18#i, route-finding means 20#i, device-recognizing means 22#i and request & information-transmitting means 24#i.

Next, the operation of the communication network shown in FIG. 1 is explained. A device such as a relay apparatus 26#ij controlled by a network control apparatus 10#i or a communication terminal 28#ij connected to a relay apparatus 26#ij transmits a request for setting of routes from a device serving as a start point to a device serving as an end point to the network control apparatus 10#i. Request-receiving means 12#i receives the request for setting of routes. The database 14#i is used for storing device information for identifying a device controlled by the network control apparatus 10#i and topology information showing a logical link between each device located in the area i and a device adjacent to the area i. The request-range-judging means 16#i refers to the database 14#i to form a judgment as to whether or not a device serving as a start point and the device serving as an end point specified in the request are devices controlled directly by the network control apparatus 10#i. If the outcome of the judgment indicates that the device serving as a start point and the device serving as an end point specified in the request are devices controlled directly by the network control apparatus 10#i, the route-finding means 20#i finds routes between the device serving as a start-point and the device serving as an end point specified in the request.

The device-recognizing means 22#i recognizes devices on the routes found by the route-finding means 20#i or lower-level network control apparatuses controlling areas passed through by the routes. Then, the device-recognizing means 22#i creates a lower-level request for setting of routes. The request is destined for the devices or the lower-level network control apparatuses recognized by the device-recognizing means 22#i. The request & information-transmitting means 24#i transmits the lower-level request for setting of routes to the devices or the lower-level network control apparatuses recognized by the device-recognizing means 22#i.

If the outcome of the judgment indicates that the device serving as a start point and/or the device serving as an end point specified in the request are not devices controlled directly by the network control apparatus 10#i, on the other hand, the request-transmitting means 18#ij transmits the request for setting of routes to an upper-level network control apparatus controlling the network control apparatus 10#i. Receiving the request for setting of routes, the upper-level network control apparatus forms a judgment as to whether or not the device serving as a start point and the device serving as an end point specified in the request are devices controlled directly by the upper-level network control apparatus.

If the outcome of the judgment indicates that the device serving as a start point and the device serving as an end point specified in the request are devices controlled directly by the upper-level network control apparatus, the upper-level network control apparatus finds routes between the device serving as a start point and the device serving as an end point, and transmits a lower-level request for setting of routes to the lower-level network control apparatuses controlling areas passed through by the routes as the network control apparatus 10#i does. In this way, when a network control apparatus receives a request for setting of routes, the routes are found by one of network control apparatuses organized to form a hierarchical structure and, finally, a network control apparatus at the lowest hierarchical level transmits a lower-level request for setting of routes to relevant relay apparatuses. Since the database 14#i is used for storing information on only devices located in the area i controlled by the network control apparatus 10#i, the amount of stored communication network information, the magnitude of a processing load to find routes and the number of linked connections in a network control apparatus do not rise even if the scale of the communication network becomes large.

Figure 2:
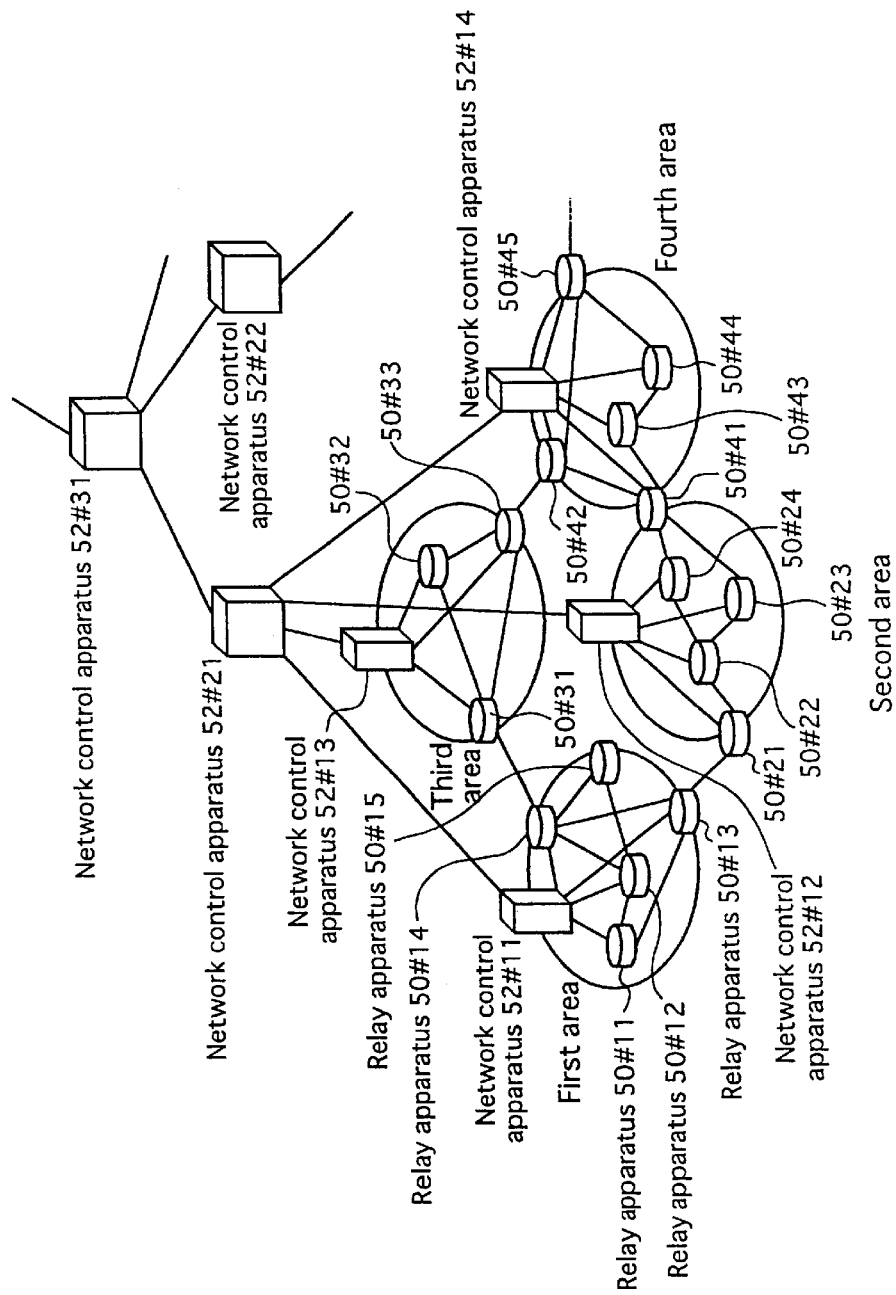
FIG. 2 is a diagram showing the configuration of a communication network implemented by an embodiment of the present invention.
Figure 3:
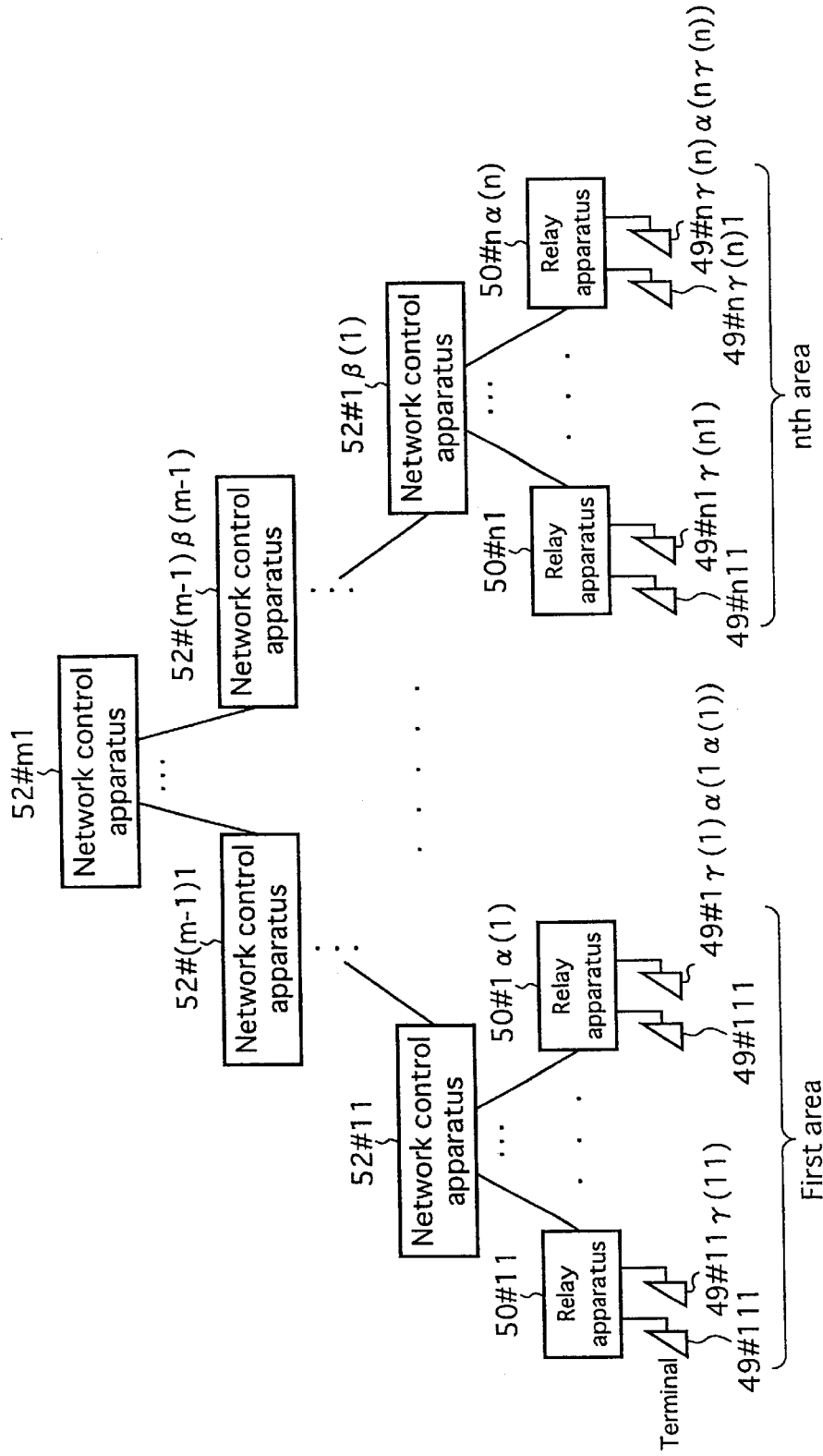
FIG. 3 is a diagram showing a hierarchical structure of network control apparatuses provided by an embodiment of the present invention.

FIG. 2 is a diagram showing the configuration of a communication network implemented by an embodiment of the present invention. FIG. 3 is a diagram showing a hierarchical structure of network control apparatuses 52#hi provided by an embodiment of the present invention where h=1 to m and i=1 to α(h). The suffix h is the number of a hierarchical layer in the hierarchical structure. For example, a number of 1 is assigned to the first hierarchical layer at the bottom level. m is the number of hierarchical layers of the network control apparatuses 52#hi where h=1 to m and i=1 to β(h) in the hierarchical structure. Notation β(h) is the number of network control apparatuses 52#hi at a hierarchical layer h to which the hierarchical number h is assigned. m and β(h) are each a number that can be set with a high degree of freedom in dependence on the scale of the communication network. As shown in FIG. 2, the communication network is divided into a plurality of areas i where i=1, 2 and so on.

In the example shown in FIG. 2, devices located in an ith area are controlled by the network control apparatus 52#1i on the bottom layer at the lowest hierarchical level where i=1 to n (=β(1)). The devices located in an area i are relay apparatuses 50#ij where j=1 to m (=α(i)). Notation α(i) is the number of relay apparatuses 50#ij located in area i. Each of the relay apparatuses 50#ij where j=1 to n covers a plurality of communication terminals 49#ijk not shown in the figure where k=1 to l (=γ(i, j)). With this hierarchical structure, the amount of stored communication network information, the magnitude of a processing load to find routes and the number of linked connections in each network control apparatus 52#hi do not rise even if the scale of the communication network becomes large. Notation γ(i, j) is the number of communication terminals 49#ijk connected to the relay apparatus 50#ij. For i=1, for example, the network control apparatus 52#11 controls the relay apparatuses 50#1j located in the first area where j=1 to 4. The relay apparatus 50#11 covers communication terminals 49#11k where k=1 to γ(1, 1). In the same way, the relay apparatus 50#12 covers communication terminals 49#12k where k=1 to γ(1, 2). By the same token, the relay apparatus 50#13 covers communication terminals 49#13k where k=1 to γ(1, 3). Likewise, the relay apparatus 50#14 covers communication terminals 49#14k where k=1 to γ(1, 4).

The relay apparatuses 50#11 to 50#14 are controlled by the network control apparatus 52#11. The relation described above holds true of i=2 to 4, that is, holds true of the second to fourth areas shown in the figure. In the communication network shown in FIG. 2, a solid line connecting relay apparatuses 50#ij represents a physically connected transmission line. A solid line connecting a relay apparatus 50#ij to a network control apparatus 52#1i or connecting a network control apparatus 52#hi to another network control apparatus 52#hi represents a logical connection, which can be a physically connected transmission line or a link logically established through a communication network such as the Internet.

A communication terminal 49#ijk is a user terminal such as a personal computer or a workstation connected to a relay apparatus 50#ij. A communication terminal 49#ijk has functions such as transmitting a request for setting of routes to a network control apparatus 52#1i for establishing a connection prior to a communication, setting the address of a transmission destination and the address of a transmission source in communicated data such as a packet, transmitting the communicated data to a relay apparatus 50#ij in accordance with a predetermined protocol and accepting communicated data transmitted by the relay apparatus 50#ij for processing if the communicated data includes a transmission-destination address matching the communication terminal address of its own. The predetermined protocol is not prescribed in particular. Examples of the protocol include ATM, an IP and an IPX.

As described above, each of the relay apparatuses 50#ij where j=1 to n covers a plurality of communication terminals 49#ijk where k=1 to l (=γ(i, j)). The relay apparatus 50#ij has functions such as guaranteeing a bandwidth of transmission to another relay apparatus 50#ij specified in device-setting information received from a network control apparatus 52#ij and routing communicated data received from a communication terminal 49#ijk or relay apparatus to a predetermined relay apparatus 50#ij according to the device-setting information.

The relay apparatus 50#ij represents a router, an X25 packet exchange and an ATM switch. Thus, the network control apparatus 52#1i where i=1 to n (=β(1)) controls a plurality of relay apparatuses 50#ij connected thereto where j=1 to m (=α(i)) and a plurality of communication terminals 49#ijk connected to each of the relay apparatuses 50#ij where k=1 to l (=γ(i, j)). In addition, an upper-level network control apparatus 52#hg controls lower-level network control apparatuses 52#(h-1)i where (2≦h≦m).

Each network control apparatus 52#hi has the following basic common functions without regard to the hierarchical level of the control network apparatus 52#hi:

1: When the network control apparatus 52#hi receives communication network information to be described later from a device, the control network apparatus 52#hi creates a topology database showing information on linking among relay apparatuses 50#ij to be described later and a device-list file showing devices controlled by the network control apparatus 52#hi. A device is a relay apparatus, a communication terminal, a console, a network control apparatus or the like. The information on linking among relay apparatuses 50#ij is information on a physical connection relation between each of the relay apparatuses 50#ij and relay apparatuses 50#ij adjacent thereto and information on a bandwidth for each relation.

2: The network control apparatus 52#hi forms communication network information to make the communication network information visible to an upper-level network control apparatus 52#(h+1)i controlling only link relations among relay apparatuses located on borders between a plurality of controlled areas merged into a single merge area, and transmits the formed communication network information to the upper-level network control apparatus 52#(h+1)i. A relay apparatus located on a border between areas will be defined later. Devices in each of the areas are controlled by the network control apparatus 52#hi and devices in the single merge area are controlled by the upper-level network control apparatus 52#(h+1)i.

Figure 4:
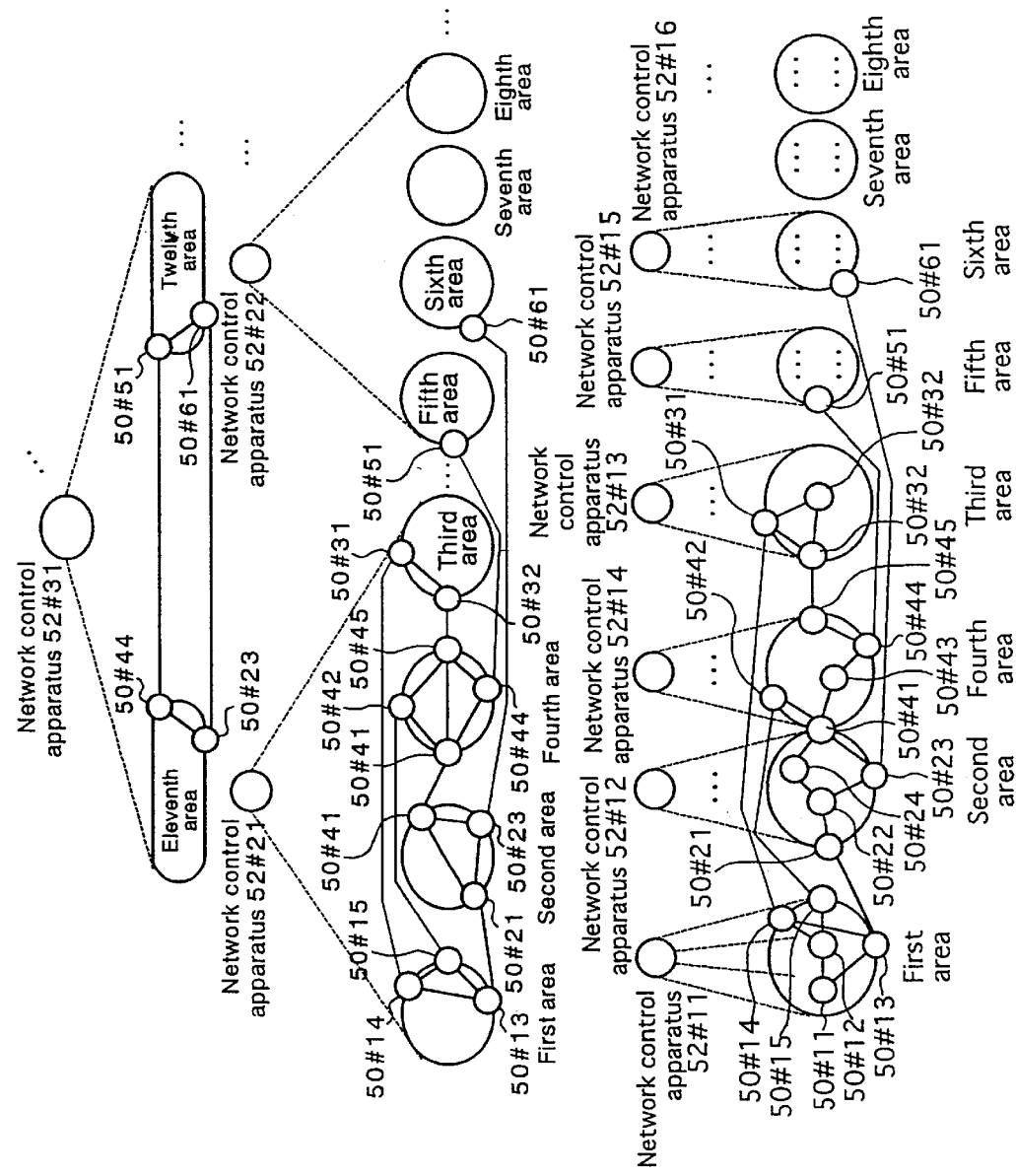
FIG. 4 is a diagram showing a topology visible to each network control apparatus provided by an embodiment of the present invention.

FIG. 4 is a diagram showing a topology visible to each network control apparatus provided by an embodiment of the present invention. As shown in FIG. 4, a topology of devices such as relay apparatuses and communication terminals in an ith area is visible to a network control apparatus 52#1i on the bottom layer at the lowest hierarchical level where i=1 to n. An upper-level network control apparatus 52#21 controls a plurality of areas, namely, the first to fourth areas. To put it in detail, a topology among relay apparatuses located on the borders between the ith areas where i=1 to 4 is visible to the upper-level network control apparatus 52#21. For example, a topology among relay apparatuses 50#13, 50#14 and 50#15 located on the border of the first area is visible to the upper-level network control apparatus 52#21. A relay apparatus on the border of an area is a relay apparatus having a connection to a relay apparatus in another area. Thus, a topology between the relay apparatuses 50#13, 50#14 and 50#15 and the relay apparatus 50#21 in the second area, the relay apparatus 50#31 in the third area and the relay apparatus 50#42 in the fourth area respectively is also visible to the upper-level network control apparatus 52#21. An uppermost-level network control apparatus 52#31 controls devices a plurality of areas, namely, the first to fourth areas and a plurality of areas, namely, the fifth to eighth areas, which is controlled by another upper-level network control apparatus 52#22.

The first to fourth areas are merged into a single area 11 whereas the fifth to eighth areas are merged into a single area 12. To the uppermost-level network control apparatus 52#31, a topology among relay apparatuses 50#23, 50#44, 50#51 and 50#62 on the border between the single areas 11 and 12 is visible. In the following description, an area controlled by a network control apparatus 52#hi is a single area obtained as a result of merging of all areas each controlled by a network control apparatus on a layer at a hierarchical level below the network control apparatus 52#hi. Thus, area topologies visible to the network control apparatuses 52#hi also form a hierarchical structure. As a result, it is possible to implement a communication network wherein the amount of stored communication network information, the magnitude of a processing load to find routes and the number of linked connections in each network control apparatus do not rise.

3: When a network control apparatus 52#hi receives a request for setting of routes from a device, the control network apparatus 52#hi forms a judgment as to whether or not a route to be set in accordance with the request can be found in an area controlled by the control network apparatus 52#hi. Typically, such a request is made to set routes from a communication terminal to another communication terminal at a requested bandwidth. The format of the request will be described later. Anyhow, the request includes information such as the address of a start point, the address of an end point and a requested bandwidth.

3-1: If a requested route can be found in an area controlled by the network control apparatus 52#hi, the control network apparatus 52#hi transmits device-setting information to relay apparatuses located on the route or lower-level network control apparatuses each controlling an area passed through by the route. The device-setting information is information showing the address of a relay apparatus to next relay a packet including the address of a communication destination and a requested bandwidth if such a packet is received.

The control network apparatus 52#hi forms a judgment as to whether or not a route to be set in accordance with the request for setting of routes can be found in an area controlled by the control network apparatus 52#hi, for example, by determining whether the addresses of a start point and an end point specified in the request are the addresses of devices located in the controlled area, or by forming a judgment as to whether or not the address of a start point specified in the request is the address of a device located in the controlled area and the address of an end point specified in the request is the address of a device located in an area adjacent to the controlled area.

3-2: If a requested route cannot be found in an area controlled by the network control apparatus 52#hi, on the other hand, the control network apparatus 52#hi passes on the request for setting of routes to an upper-level network control apparatus.

FIG. 5 is a functional block diagram showing a network control apparatus 54#ij implemented by a first embodiment of the present invention. All the network control apparatuses 54#ij where i=1 to m and j=α(i) have common functional blocks. As shown in FIG. 5, the network control apparatus 54#ij comprises a request-receiving unit 60, a request-range-judging unit 62, a request-transmitting unit 64, a device-recognizing unit 66, a route-finding unit 68, a request & information-transmitting unit 69, a device-information-receiving unit 70, a device-information-forming unit 72, a device-information-transmitting unit 74 and a device-information database 76.

FIG. 6 is a diagram showing the basic format of a request for setting of routes or lower-level route-requesting information. In this embodiment, a request for setting of routes and device-setting information have the same format shown in FIG. 6. The request includes the address of a start point of a requested route, the address of an end point of a requested route, the address of a communication destination and a requested bandwidth. The common format makes processing simple. To put it in detail, the network control apparatus processes a request for setting routes in the same way without regard to whether the request is received from an upper-level network control apparatus or a device in its area.

FIG. 7 is a diagram showing the format of a request for setting of routes received from a device in its area, that is, a communication terminal, a console, a relay apparatus or a lower-level network control apparatus.

As shown in FIG. 7, the request includes the address of a transmission source of the communication, the address of a communication destination, the address of a communication destination and a requested bandwidth. The format indicates a request for setting of routes from the address of a transmission source of the communication to the address of a communication destination at the requested bandwidth.

FIG. 8 is a diagram showing the format of a request for setting of routes received from an upper-level network control apparatus. As shown in FIG. 8, the request includes the address of an entrance relay apparatus of its own area or the address of a transmission source, the address of an entrance relay apparatus of a next area or the address of a transmission destination, the address of a communication destination and a requested bandwidth. The format indicates a request for setting of routes from the address of an entrance relay apparatus of its own area or the address of a transmission source to the address of an entrance relay apparatus of a next area or the address of a transmission destination at the requested bandwidth.

FIG. 9 is a diagram showing the format of device-setting information transmitted to a relay apparatus. As shown in the figure, the device-setting information includes the address of the relay apparatus, the address of a relay apparatus to relay communicated data next, the address of a communication destination and a requested bandwidth. The information is transmitted to request the relay apparatus indicated by the address of the relay apparatus to guarantee the requested bandwidth and to relay communicated data having the address of a communication destination as the address of its transmission destination to a relay apparatus indicated by the address of a relay apparatus to relay communicated data next by using the guaranteed bandwidth if such communicated data is received. The request-receiving unit 60 employed in the network control apparatus 54#ij receives a request for setting of routes shown in FIG. 7 from an external device such as a communication terminal, a console, a relay apparatus or a network control apparatus controlled by the network control apparatus 54#ij or receives a request for setting of routes shown in FIG. 8 from an upper-level controlled network control apparatus, and passes on the request to the request-range-judging unit 62.

The request-range-judging unit 62 extracts the address of a start point on a route and the address of an end point on a route from the request received from the request-receiving unit 60. The request-range-judging unit 62 then refers to a file containing a list of devices controlled by the network control unit 54#ij and a topology sub-database for storing information on links among adjacent relay apparatuses connected to the area controlled by the network control unit 54#ij to form a judgment as to whether or not routes between the address of a start point and the address of an end point extracted from the request are located in the area. The file containing a list of devices controlled by the network control unit 54#ij and the topology sub-database are stored in the device-information database 76. If the outcome of the judgment indicates that routes between the address of a start point and the address of an end point extracted from the request are located in the area, the request-range-judging unit 62 passes on the request to the device-recognizing unit 66. If the outcome of the judgment indicates that routes between the address of a start point and the address of an end point extracted from the request are not located in the area, on the other hand, the request-range-judging unit 62 passes on the request to the request-transmitting unit 64 for transmitting the request to an upper-level network control unit. The device-recognizing unit 66 extracts the address of a start point on a route, the address of an end point on a route and the requested bandwidth for a communication line from the request received from the request-range-judging unit 62, notifying the route-finding unit 68 of the address of a start point on a route, the address of an end point on a route and the requested bandwidth. The device-recognizing unit 66 creates device-setting information shown in FIG. 9 or 10 to be transmitted to devices such as communication terminals and relay apparatuses in the area controlled by this network control apparatus 54#ij on the basis of a result received from the route-finding unit 68.

In the case of device-setting information transmitted to a relay apparatus or a communication terminal, the address of a start point on a route is used as the address of the relay apparatus requested to set a bandwidth or the address of the communication terminal, whereas the address of an end point on a route is used as the address of a next device to receive communicated data from the relay apparatus. In the case of device-setting information transmitted to a lower-level network control apparatus or the so-called device-setting request, on the other hand, the address of a start point on a route is used as the address of an entrance relay apparatus of an area controlled by the recipient network control apparatus or the address of a transmission source of the communication, whereas the address of an end point on a route is used as the address of an entrance relay apparatus of an adjacent area to received communicated data from an area controlled by the recipient network control apparatus or the address of transmission destination. The created device-setting information to be transmitted to devices is supplied to the request & information-transmitting unit 69 for transmitting the information to the devices.

The request-transmitting unit 64 transmits the request for setting of routes received from the request-range-judging unit 62 to an upper-level network control apparatus controlling the apparatus 54#ij. The route-finding unit 68 searches the topology sub-database for devices on the routes matching the address of a start point on a route, the address of an end point on a route and the requested bandwidth, which are used as search keys of the search operation. The route-finding unit 68 then informs the device-recognizing unit 66 of the devices found in the search operation. In the case of a network control apparatus on the bottom layer at the lowest hierarchical level for directly controlling relay apparatuses and communication terminals, a device found in a search operation is a relay apparatus or a communication terminal directly controlled thereby. In the case of a network control apparatus at an upper hierarchical level for controlling lower-level network control apparatuses, on the other hand, a device found in a search operation is a network control apparatus controlled thereby or a relay apparatus located on the border of a controlled area. It should be noted that, in the case of a network control apparatus for controlling relay apparatuses, communication terminals and network control apparatuses, a device found in a search operation can be a relay apparatus, a communication terminal, a network control apparatus or a relay apparatus located on the border of a controlled area. As described above, the route-finding unit 68 then informs the device-recognizing unit 66 of the devices found in the search operation.

Also as described above, the device-recognizing unit 66 supplies the created device-setting information to be transmitted to devices to the request & information-transmitting unit 69 for transmitting the information to the devices, which can be relay apparatuses or network control apparatuses. The device-setting information is transmitted by using an existing protocol. That is to say, the device-setting information is converted so as to conform to a device setting protocol that can be interpreted by the recipient devices prior to transmission of a message based on the protocol. Accordingly, a device on the communication network can be connected to a network control apparatus without modifying the device. The device-information-receiving unit 70 receives communication network information from a device such as a communication terminal, a relay apparatus or a network control apparatus. The communication network information can be first communication network information or second communication network information.

FIG. 10 is a diagram showing the format of first communication network information. As shown in FIG. 10, the first communication network information is link information showing a topology of the communication network. First communication network information received from a device involved in an actual communication of data such as a communication terminal or a relay apparatus shows a physical link state.

FIG. 11 is a diagram showing the format of second communication network information. As shown in FIG. 11, the second communication network information is a list of addresses of devices controlled by the network control apparatus. In general, a relay apparatus and a communication terminal do not control any device. For this reason, it is not necessary for a relay apparatus and a communication terminal to create second communication network information. On the other hand, a network control apparatus creates second communication network information or a list of addresses of apparatuses, which include relay apparatuses controlled thereby, communication terminals connected to the relay apparatuses, relay apparatuses controlled by lower-level network control apparatuses controlled by the network control apparatus creating the network and communication terminals connected to relay apparatuses controlled by the lower-level network control apparatuses.

The device-information-receiving unit 70 receives communication network information and uses the information as a base for creating or updating a device-list file and a topology sub-database stored in the device-information database 76. The topology sub-database is used for storing information on communication network topologies whereas the device-list file contains a list of devices controlled by the network control apparatus owning the device-information database 76. To put it in detail, in accordance with the communication network information, the device-information-receiving unit 70 creates new links and nodes in the topology sub-database, deletes existing links and nodes from the sub-database, sets or changes a link bandwidth, catalogs the address of a new device into the list of devices, deletes the address of a cataloged device from the list and changes the address of a cataloged device on the list.

FIG. 12 is a diagram showing a device-list file stored in a device-information database employed in a network control apparatus. As shown in FIG. 12, the file is a list of area IDs and addresses of devices located in an area indicated by each of the IDs. An area ID is assigned to each area controlled by the network control apparatus owning the device-information database. In finding a route, the route-finding unit 68 refers to the ID-list file to identify an area in which each device on the route is located. First communication network information and second communication network information do not include an area ID. By copying area IDs to a memory shown in none of the figures, however, a lower-level network control apparatus or a network control apparatus receiving first communication network information and second communication network information is capable of finding an area ID from the memory.

Figure 13:
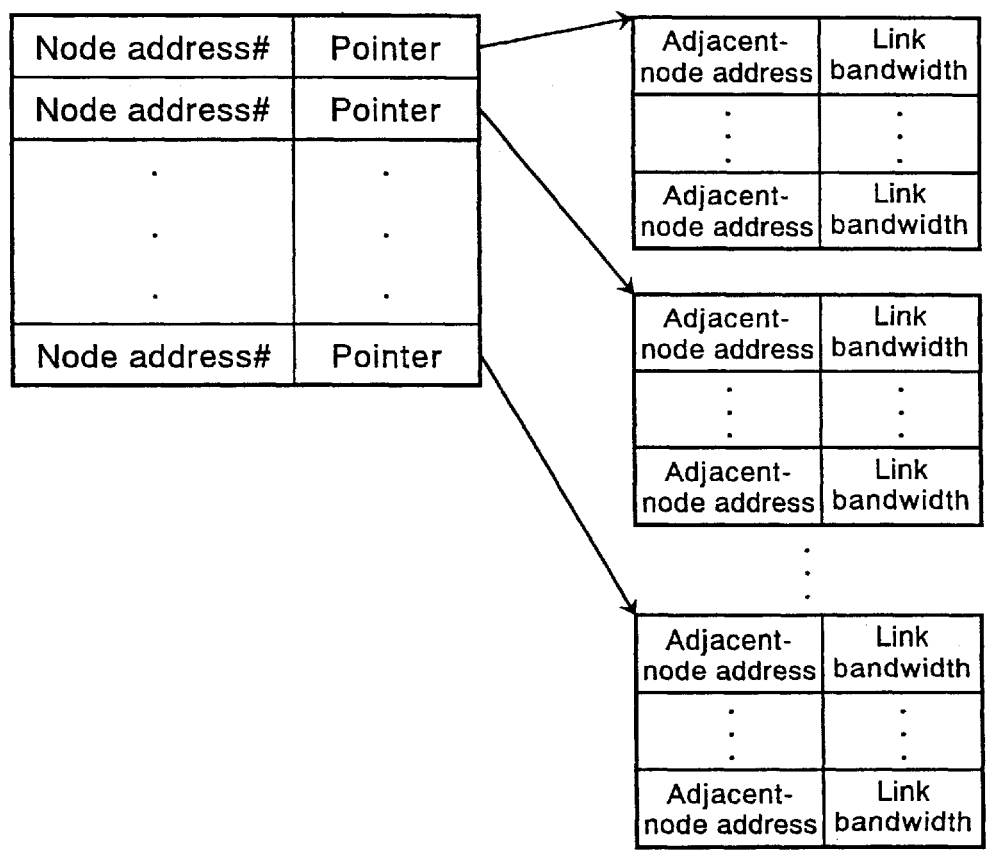
FIG. 13 is a diagram showing a topology sub-database stored in the device-information database employed in the network control apparatus shown in FIG. 5.

FIG. 13 is a diagram showing a topology sub-database stored in a device-information database employed in a network control apparatus. As shown in FIG. 13, the topology sub-database is a list of node addresses set in first communication network information. The node addresses cataloged on the list are each associated with a pointer. The pointers cataloged on the list each point to a sub-list of addresses of nodes adjacent to nodes whose addresses are set in first communication network information. The addresses of the adjacent nodes on every sub-list are each associated with a link bandwidth. Such a relation means that a link bandwidth is used for connecting an adjacent node indicated by an address associated with the link bandwidth on the sub-list to a node on the list indicated by an address associated with a pointer pointing to the address of the adjacent node.

If an upper-level network control apparatus controlling this network control apparatus 54#ij exists, the device-information-receiving unit 70 supplies the first communication network information and the second communication network information to the device-information-forming unit 72. The device-information-forming unit 72 forms pieces of first communication network information and pieces of second communication network information received from devices controlled by this network control apparatus 54#ij into first communication network information and second communication network information to be transmitted to the upper-level network control apparatus by creating information on links (and their bandwidths) among relay apparatuses located on borders between areas. There are a variety of possible methods of forming bandwidths. First and second bandwidth determination methods described below are each a typical technique. Te first bandwidth determination method is a technique of selecting a bandwidth of a shortest route as a bandwidth between relay apparatuses located on the border of an area. A network control apparatus 54#ij at any hierarchical level is capable of adopting this first bandwidth determination method.

Figure 14:
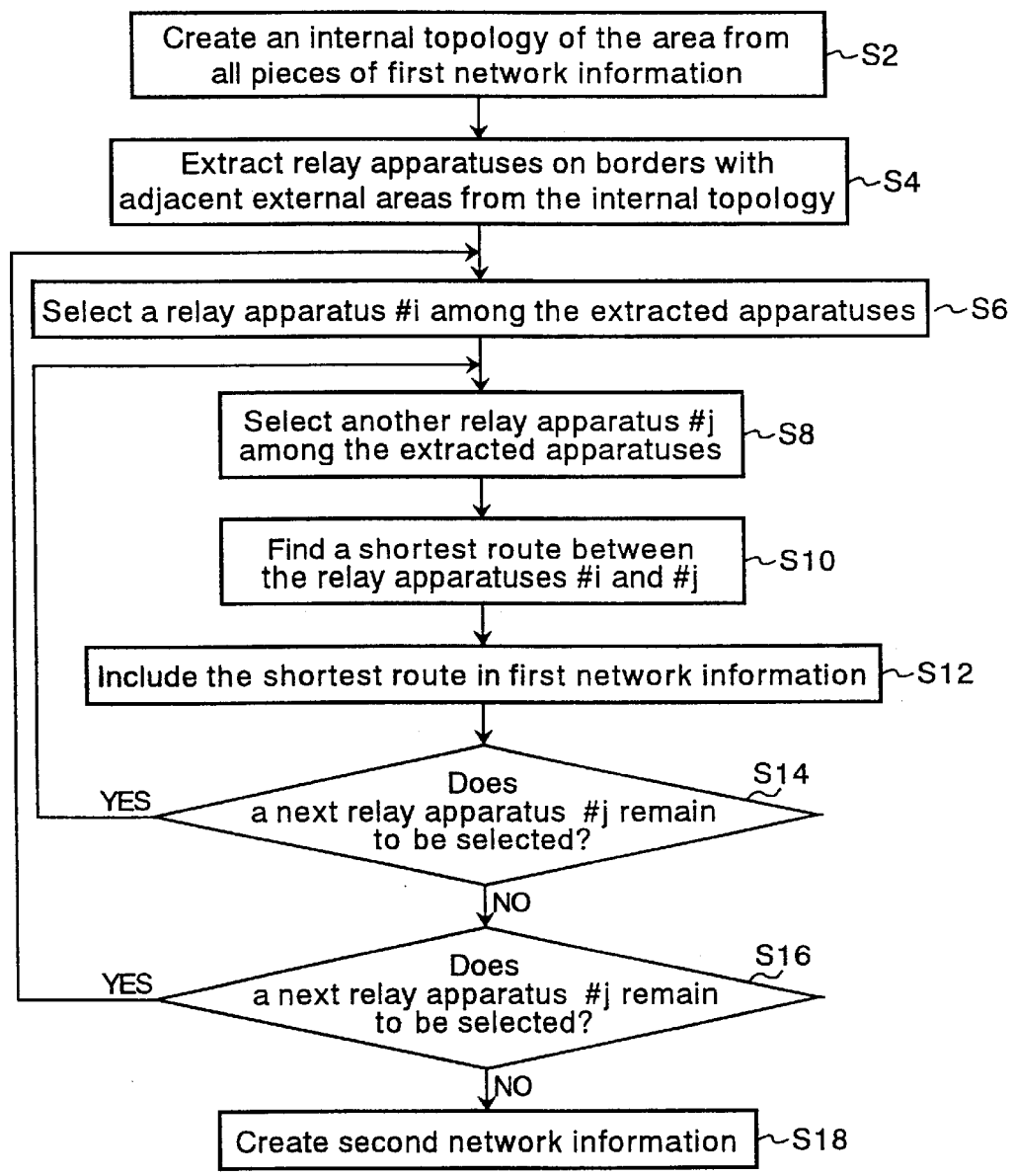
FIG. 14 is a flowchart representing a first bandwidth determination method.

FIG. 14 is a flowchart representing the first bandwidth determination method.

Figure 15:
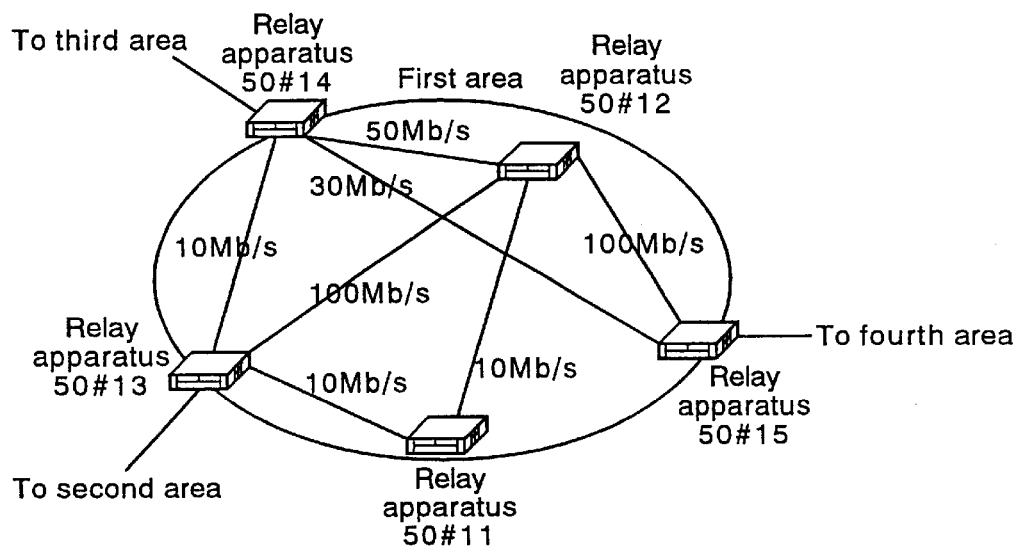
FIG. 15 is a diagram showing details of a first area.
Figure 16:
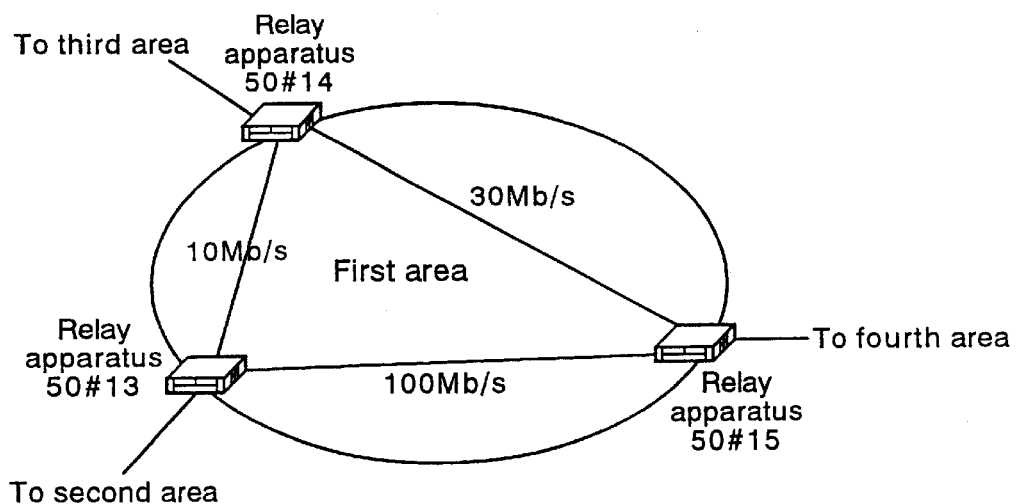
FIG. 16 is a diagram showing a result produced by the first bandwidth determination method.

FIG. 15 is a diagram showing details of the first area shown in FIGS. 2 to 4. FIG. 16 is a diagram showing a result produced by the first bandwidth determination method. The flowchart shown in FIG. 14 begins with a step S2 at which the device-information-forming unit 72 obtains information on what other relay apparatuses each relay apparatus is connected to and information on what bandwidths each relay apparatus is connected at to the other relay apparatuses from the first communication network information. The device-information-forming unit 72 uses these pieces of information for creating an internal topology of the first area. At the next step S4, the device-information-forming unit 72 extracts all relay apparatuses located on the border of the first area from the internal topology of the first area. At the next step S6, the device-information-forming unit 72 refers to the internal topology to select a relay apparatus among those extracted at the step S4. For example, the device-information-forming unit 72 selects a relay apparatus 50#13 at the step S6. At the next step S8, the device-information-forming unit 72 selects another relay apparatus among those extracted at the step S4 by referring to the internal topology of the first area. For example, the device-information-forming unit 72 selects a relay apparatus 50#14 at the step S8.

At the next step S10, the device-information-forming unit 72 finds the shortest route between the relay apparatus selected at the step S6 and the relay apparatus selected at the step S8. In this case, the shortest route between the relay apparatus 50#13 and the relay apparatus 50#14 is found to be a route with a bandwidth of 10 Mb/s. At the next step S12, the device-information-forming unit 72 stores the link information for the shortest route into the first communication network information being formed. At the next step S14, the device-information-forming unit 72 forms a judgment as to whether or not another relay apparatus remains to be selected at the step S8. If the outcome of the judgment indicates that another relay apparatus remains to be selected at the step S8, the flow of the bandwidth determination method goes back to the step S8. If the outcome of the judgment indicates that all other relay apparatuses have been selected at the step S8, on the other hand, the flow of the bandwidth determination method goes on to the next step S16. At the step S16, the device-information-forming unit 72 forms a judgment as to whether or not a relay apparatus extracted at the step S4 remains to be selected at the step S6. If the outcome of the judgment indicates that a relay apparatus extracted at the step S4 remains to be selected at the step S6, the flow of the bandwidth determination method goes back to the step S6. As a result of the processing carried out at the above steps, topology information shown in FIG. 16 is obtained. If the outcome of the judgment indicates that all the relay apparatuses extracted at the step S4 have been selected at the step S6, on the other hand, the flow of the bandwidth determination method goes on to the next step S18. At the step S18, the device-information-forming unit 72 forms second communication network information from the first communication network information and the second communication network information, which were received from the device-information-receiving unit 70.

FIG. 17 is a diagram showing first communication network information produced by the first bandwidth determination method. As shown in FIG. 17, the first communication network information produced by the first bandwidth determination method includes the address of a border relay apparatus 50#13, the address of a border relay apparatus 50#15, 100 Mb/s, the address of a border relay apparatus 50#14, 10 Mb/s, the address of the relay apparatus 50#14, the address of the relay apparatus 50#13, 10 Mb/s, the address of the relay apparatus 50#15, 30 Mb/s, the address of the relay apparatus 50#15, the address of the relay apparatus 50#13, 100 Mb/s, the address of the relay apparatus 50#14 and 30 Mb/s.

Figure 18:
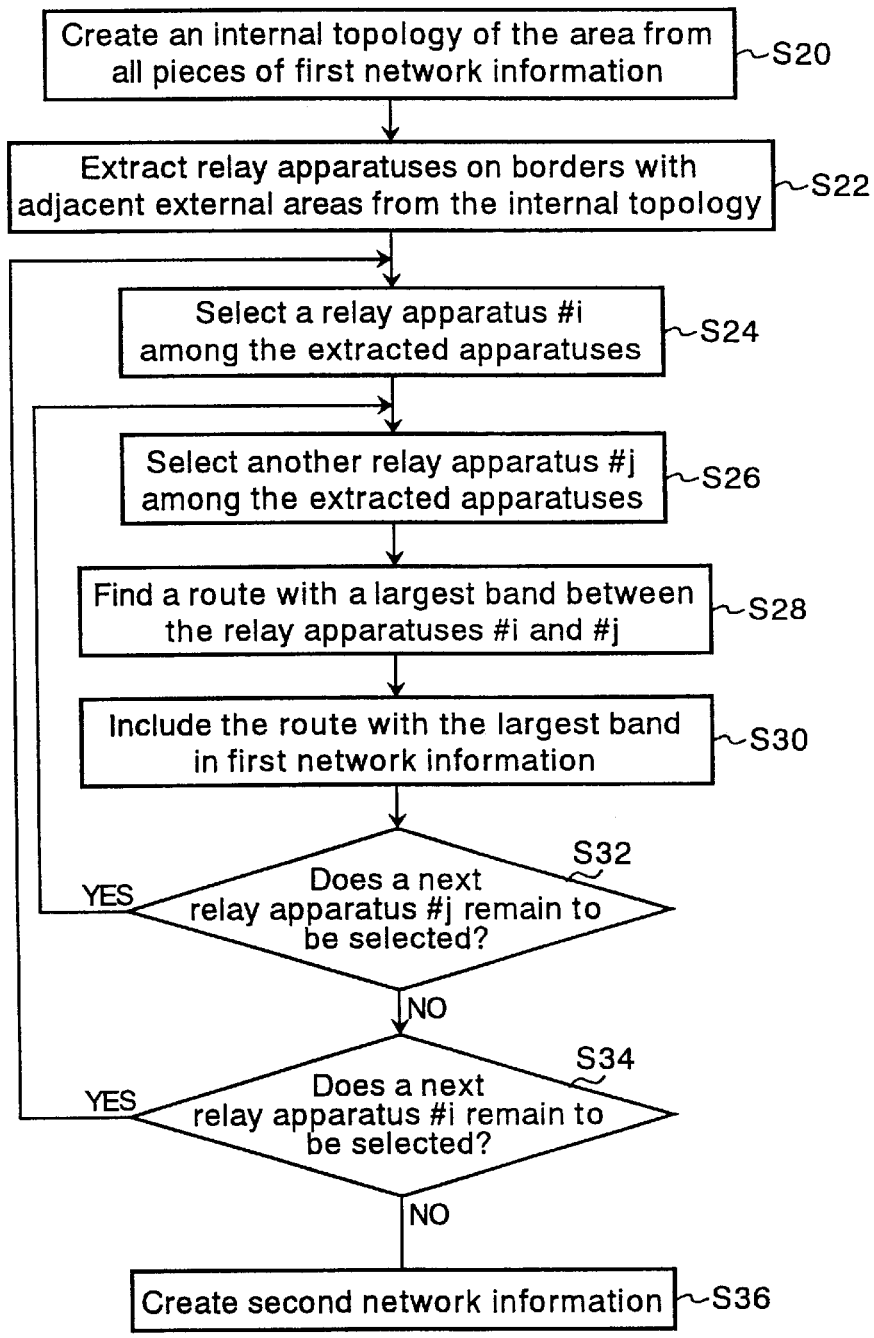
FIG. 18 is a flowchart representing a second bandwidth determination method.
Figure 19:
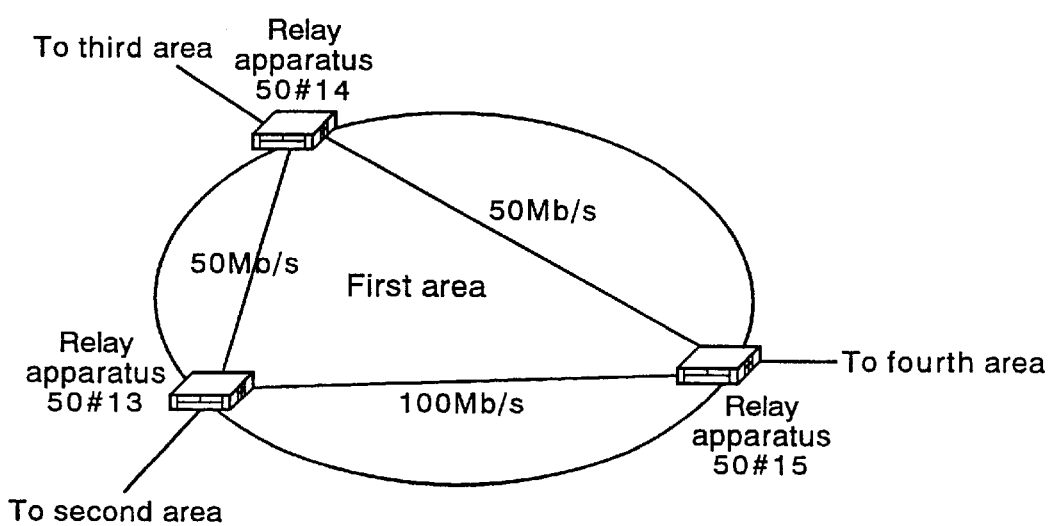
FIG. 19 is a diagram showing a result produced by the second bandwidth determination method.

With the second bandwidth determination method, a largest bandwidth among routes between relay apparatuses located on a border of an area is selected as an inter-area bandwidth. FIG. 18 is a flowchart representing a second bandwidth determination method. FIG. 19 is a diagram showing a result produced by the second bandwidth determination method. The flowchart shown in FIG. 18 begins with a step S20 at which the device-information-forming unit 72 obtains information on what other relay apparatuses each relay apparatus is connected to and information on what bandwidths each relay apparatus is connected at to the other relay apparatuses from the first communication network information. The device-information-forming unit 72 uses these pieces of information for creating an internal topology of the first area. At the next step S22, the device-information-forming unit 72 extracts all relay apparatuses located on the border of the first area from the internal topology of the first area.

At the next step S24, the device-information-forming unit 72 refers to the internal topology to select a relay apparatus among those extracted at the step S22. For example, the device-information-forming unit 72 selects the relay apparatus 50#13 at the step S24. At the next step S26, the device-information-forming unit 72 selects another relay apparatus among those extracted at the step S22 by referring to the internal topology of the first area. For example, the device-information-forming unit 72 selects the relay apparatus 50#14 at the step S26.

At the next step S28, the device-information-forming unit 72 finds a route with a largest bandwidth between the relay apparatus selected at the step S24 and the relay apparatus selected at the step S26. In this case, a route with a largest bandwidth between the relay apparatus 50#13 and the relay apparatus 50#14 is found to be a route with a bandwidth of 50 Mb/s. At the next step S30, the device-information-forming unit 72 stores the link information for the route with the largest bandwidth into the first communication network information being formed. At the next step S32, the device-information-forming unit 72 forms a judgment as to whether or not another relay apparatus remains to be selected at the step S26. If the outcome of the judgment indicates that another relay apparatus remains to be selected at the step S26, the flow of the bandwidth determination method goes back to the step S26. If the outcome of the judgment indicates that all other relay apparatuses have been selected at the step S26, on the other hand, the flow of the bandwidth determination method goes on to the next step S34. At the step S34, the device-information-forming unit 72 forms a judgment as to whether or not a relay apparatus extracted at the step S22 remains to be selected at the step S24. As a result of the processing carried out at the above steps, topology information shown in FIG. 19 is obtained. If the outcome of the judgment indicates that a relay apparatus extracted at the step S22 remains to be selected at the step S24, the flow of the bandwidth determination method goes back to the step S24. If the outcome of the judgment indicates that all the relay apparatuses extracted at the step S22 have been selected at the step S24, on the other hand, the flow of the bandwidth determination method goes on to the next step S36. At the step S36, the device-information-forming unit 72 forms second communication network information from the first communication network information and the second communication network information, which were received from the device-information-receiving unit 70.

FIG. 20 is a diagram showing first communication network information produced by the second bandwidth determination method. As shown in FIG. 20, the first communication network information produced by the second bandwidth determination method includes the address of the border relay apparatus 50#13, the address of the border relay apparatus 50#15, 100 Mb/s, the address of the border relay apparatus 50#14, 50 Mb/s, the address of the relay apparatus 50#14, the address of the relay apparatus 50#13, 50 Mb/s, the address of the relay apparatus 50#15, 50 Mb/s, the address of the relay apparatus 50#15, the address of the relay apparatus 50#13, 100 Mb/s, the address of the relay apparatus 50#14 and 50 Mb/s.

In accordance with another bandwidth determination method, a sum of bandwidths of all routes between relay apparatuses located on the border of an area is selected as an inter-area bandwidth. The bandwidth determination methods described above each provide an upper-level network control apparatus with topology information comprising pieces of link information of relay apparatuses on the border of an area controlled by each network control apparatus controlled by the upper-level network control apparatus, and results in a hierarchical topology sub-database as shown in FIG. 4. As a result, it is possible to solve a problem of a topology sub-database's becoming large due to an increase in communication network scale.

Next, the operation of the communication network shown in FIG. 2 is explained.

1: Creating and updating the device-information database 76

Figure 21:
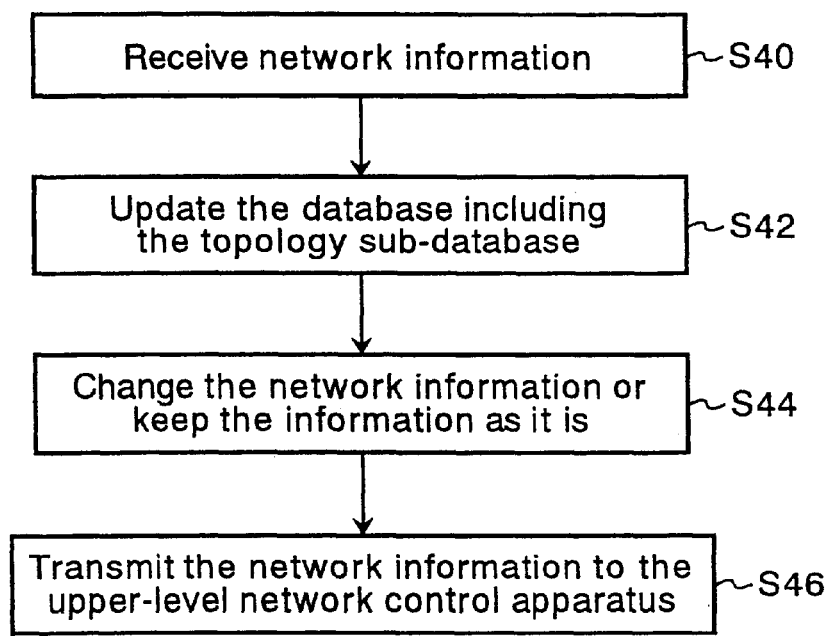
FIG. 21 is a flowchart representing operations carried out by a device-information-receiving unit, a device-information-forming unit and a device-information-transmitting unit, which are employed in the network control apparatus shown in FIG. 5.
Figure 22:
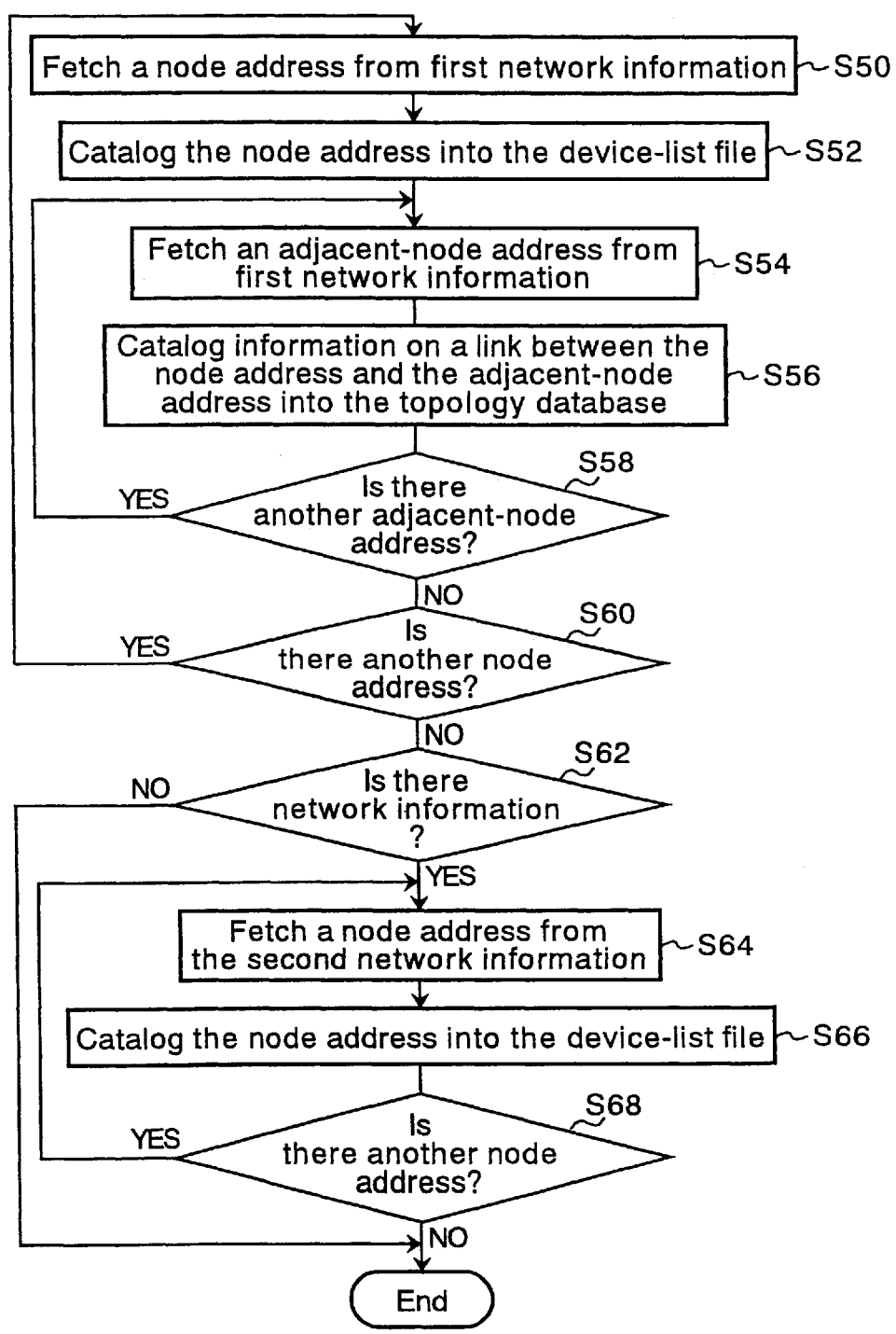
FIG. 22 is a flowchart representing details of a step S42 of the flowchart shown in FIG. 21.

When a communication network is constructed, a device-information database 76 like the one employed in the network control apparatus shown in FIG. 5 is created. FIG. 21 is a flowchart representing operations carried out by the device-information-receiving unit 70, the device-information-forming unit 72 and the device-information-transmitting unit 74, which are employed in the network control apparatus shown in FIG. 5. In the example show in FIG. 2, devices located in an ith area are controlled by the network control apparatus 52#1i on the bottom layer at the lowest hierarchical level where i=1 to n (=β(1)). The devices located in the ith area are relay apparatuses 50#ij where j=1 to m (=α(i)). Each of the relay apparatuses 50#ij where j=1 to n covers a plurality of communication terminals 49#ijk not shown in the figure where k=1 to l (=γ(i, j)). Each of the communication terminals 49#ijk transmits its own communication network information to the network control apparatus 52#1i. The flowchart shown in FIG. 21 begins with a step S40 at which the device-information-receiving unit 70 employed in the network control apparatus shown in FIG. 5 receives first communication network information. At the next step S42, the device-information-receiving unit 70 creates a device-information database 76 including a topology sub-database in accordance with a flowchart shown in FIG. 22. FIG. 22 is a flowchart representing details of the step S42 of the flowchart shown in FIG. 21.

The flowchart shown in FIG. 22 begins with a step S50 at which the device-information-receiving unit 70 extracts the address of a node from the first communication network information. At the next step S52, the device-information-receiving unit 70 catalogs the address of the node in a device-list file. At the next step S54, the device-information-receiving unit 70 extracts the address of an adjacent node of the node extracted in step S50 from the first communication network information. At the next step S56, the device-information-receiving unit 70 catalogs information on a link between the address of the node and the address of the adjacent node in a topology sub-database. At the next step S58, the device-information-receiving unit 70 forms a judgment as to whether or not there is the address of another adjacent node, which remains to be processed. If the outcome of the judgment indicates that there is the address of another adjacent node, which remains to be processed, the flow of the processing goes back to the step S54. If the outcome of the judgment indicates that there is no other address of an adjacent node, which remains to be processed, on the other hand, the flow of the processing goes on the next step S60. At the next step S60, the device-information-receiving unit 70 forms a judgment as to whether or not there is the address of another node, which remains to be cataloged. If the outcome of the judgment indicates that there is the address of another node, which remains to be cataloged, the flow of the processing goes back to the step S50. If the outcome of the judgment indicates that there is no other address of a node, which remains to be cataloged, on the other hand, the flow of the processing goes on the next step S62. At the step S62, the device-information-receiving unit 70 forms a judgment as to whether or not second communication network information exists. If the outcome of the judgment indicates that second communication network information exists, the flow of the processing goes on to a step S64. If the outcome of the judgment indicates that second communication network information does not exist, on the other hand, the processing is ended.

At the step S64, the device-information-receiving unit 70 extracts the address of a node from the second communication network information. At the next step S66, the device-information-receiving unit 70 stores the address of the node in the device-list file. At the next step S68, the device-information-receiving unit 70 forms a judgment as to whether or not there is the address of another node, which remains to be cataloged. If the outcome of the judgment indicates that there is the address of another node, which remains to be cataloged, the flow of the processing goes back to the step 64. If the outcome of the judgment indicates that there is no other address of a node, which remains to be cataloged, on the other hand, the processing is ended.

The device-information-receiving unit 70 supplies the first communication network information and the second communication network information, which are received from a communication terminal 49#ijk, to the device-information-forming unit 72. At a step S44 of the flowchart shown in FIG. 21, the device-information-forming unit 72 forms or changes first communication network information and second communication network information on the basis of the first communication network information and the second communication network information, which are received from the device-information-receiving unit 70. It should be noted that, if neither first communication network information nor second communication network information is formed, it is impossible to provide merits such as reduction of the amount of communication network traffic and reduction of the amount of information handled by a network control apparatus controlling this network control apparatus 52#1i. Nevertheless, it is possible to respond to a request for setting routes correctly.

The device-information-forming unit 72 then supplies the formed first communication network information and the formed second communication network information to the device-information-transmitting unit 74. At the next step S46, the device-information-transmitting unit 74 transmits the formed first communication network information and the formed second communication network information to the upper-level network control apparatus.

The upper-level network control apparatus creates a device-information database 76 on the basis of the first communication network information and the second communication network information received from the network control apparatus 52#1i in the same way as that described above. The upper-level network control apparatus also forms first communication network information and second communication network information from pieces of first communication network information and second communication network information received from all network control apparatuses 52#1i where i=1, 2 and so on and transmits the formed first communication network information and the formed second communication network information to a next upper-level network control apparatus. In this way, network control apparatuses at all hierarchical levels each create a device-information database 76 comprising a topology sub-database and a device-list file. As described above, a topology sub-database is used for storing information on topologies of relay apparatuses on the borders of areas each controlled by a network control apparatus controlled by the network control apparatus owning the device-information database 76. On the other hand, a device-list file is a list of all devices located in the area controlled by the network control apparatus owning the device-information database 76.

2: Description of operations relevant to a route-setting request and device setting FIG. 23 is a flowchart representing operations carried out by the request-receiving unit 60, the request-range-judging unit 62, the request-transmitting unit 64, the device-recognizing unit 66, the route-finding unit 68 and the request & information-transmitting unit 69 which are employed in the network control apparatus shown in FIG. 5.

2-1: Description of operations for a case in which the address of a start point and the address of an end point specified in a request for setting of routes are addresses of devices in an area controlled by the network control unit.

Figure 24:
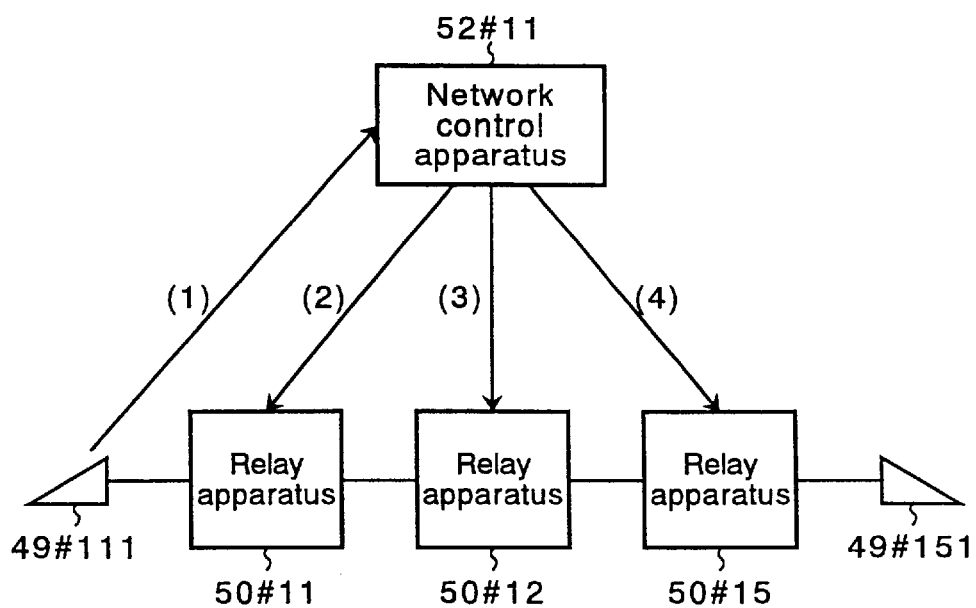
FIG. 24 is an explanatory diagram showing an operation of a case in which the address of a start point and the address of an end point are addresses of devices in an area controlled by the network control unit.
Figure 25:
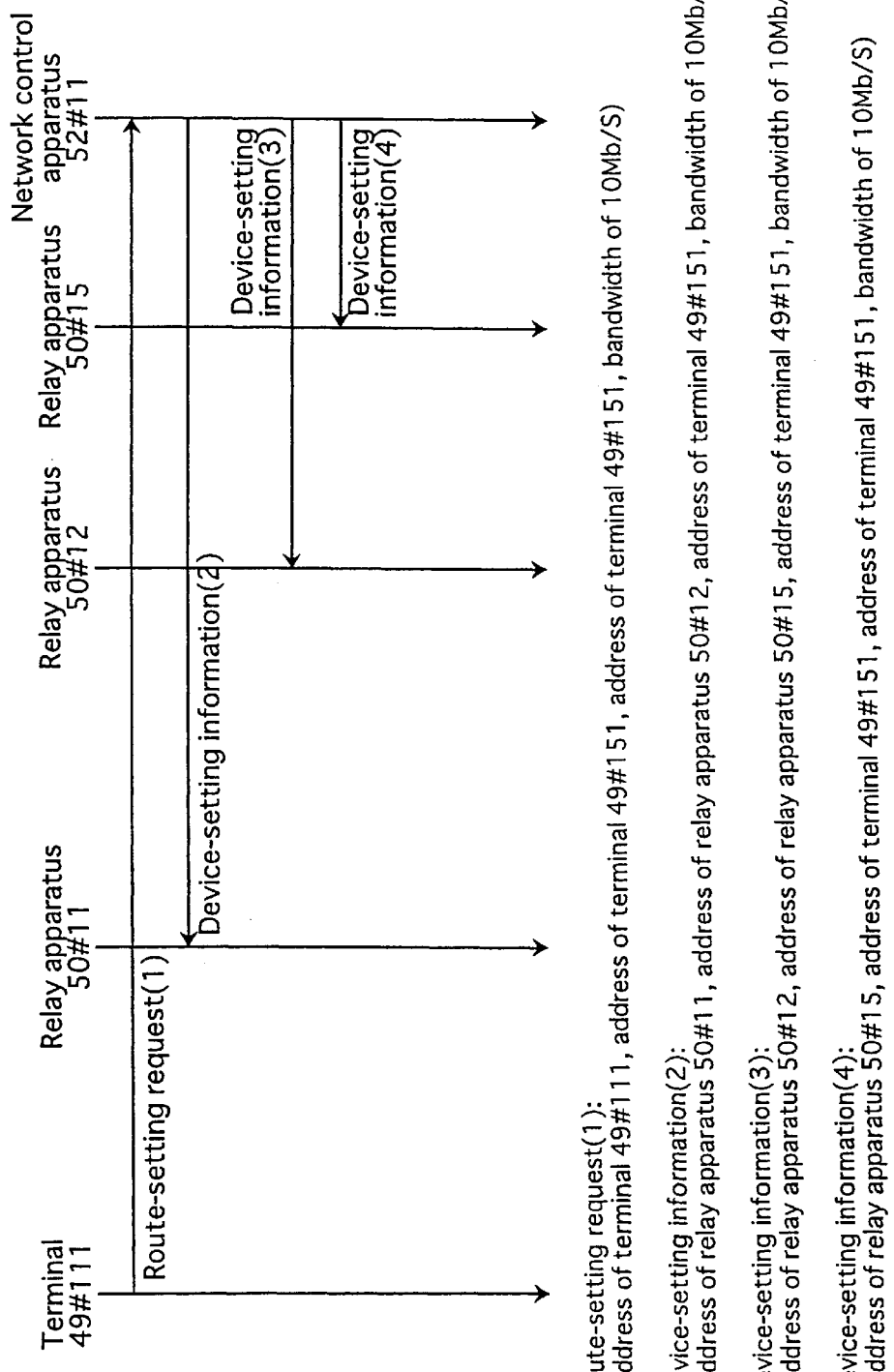
FIG. 25 is a sequence chart of the case in which the address of a start point and the address of an end point are addresses of devices in its areas.

The following description explains a case in which there is a request for a bandwidth of 10 Mb/s from a communication terminal 49#111 connected to a relay apparatus 50#11 located in the first area to a communication terminal 49#151 connected to a relay apparatus 50#15 also located in the first area. FIG. 24 is an explanatory diagram showing an operation of a case in which the address of a start point and the address of an end point are addresses of devices in the first area controlled by the network control unit 52#11. FIG. 25 is a sequence chart of a case, the operation of which is shown in FIG. 24. As shown in FIGS. 24 and 25, the communication terminal 49#111 transmits a request for setting of routes indicated by arrow (1) in FIG. 24 to the network control apparatus 52#11. The request specifies the address of the communication terminal 49#111 as the address of a start point, the address of the communication terminal 49#151 as the address of an end point, the address of the communication terminal 49#151 as the address of a communication destination and a bandwidth of 10 Mb/s.

Figure 23:
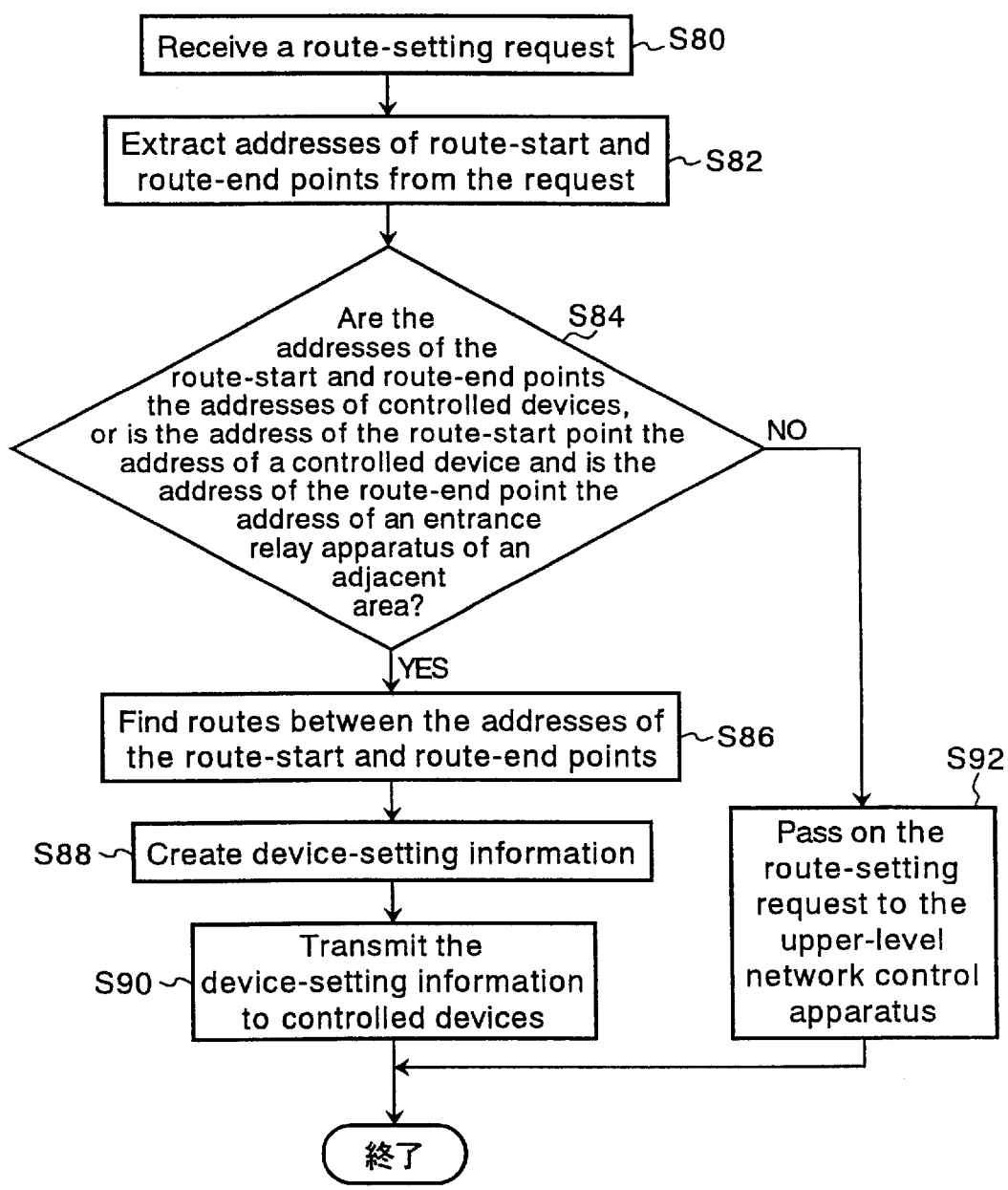
FIG. 23 is a flowchart representing operations carried out by a request-receiving unit, a request-range-judging unit, a request-transmitting unit, a device-recognizing unit, a route-finding unit and a request & information-transmitting unit, which are employed in the network control apparatus shown in FIG. 5.

The flowchart shown in FIG. 23 begins with a step S80 at which the request-receiving unit 60 employed in the communication network apparatus 52#11 receives the request for setting of routes indicated by arrow (1) in FIG. 24 and passes on the request to the request-range-judging unit 62. At the next step S82, the request-range-judging unit 62 extracts the address of a start point on a route and the address of an end point on a route from the request.

At the next step S84, the request-range-judging unit 62 refers to the device-list file and the topology sub-database to form a judgment as to whether or not a route between the address of the start point and the address of the end point is located in an area controlled by this network control apparatus 52#11. To put it in detail, the request-range-judging unit 62 forms a judgment as to whether or not the addresses of the start and end points are the addresses of devices located in the first area controlled by this network control apparatus 52#11, or forms a judgment as to whether or not the address of the start point is the address of a device located in the first area controlled by this network control apparatus 52#11 and the address of the end point is the address of an entrance relay apparatus of an area adjacent to the first area. If the outcome of the judgment indicates that a route between the address of the start point and the address of the end point is located in an area controlled by this network control apparatus 52#11, the request-range-judging unit 62 informs the device-recognizing unit 66 of this outcome. The flow of the processing then goes on to a step S86. If the outcome of the judgment indicates that a route between the address of the start point and the address of the end point is not located in the first area controlled by this network control apparatus 52#11, on the other hand, the request-range-judging unit 62 passes on the request for setting of routes to the request-transmitting unit 64. The flow of the processing then goes on to a step S92. It should be noted that the request-range-judging unit 62 is capable of forming a judgment as to whether or not a relay apparatus is an entrance relay apparatus of an area adjacent to the first area by, for example, determining whether the address of the relay apparatus is cataloged in the topology sub-database as the address of an entrance relay apparatus of an area adjacent to the first area and not cataloged in the device-list file. In this case, since the address of the communication terminal 49#111 serving as the address of a start point and the address of the communication terminal 49#151 serving as the address of an end point are both in the first area, the flow of the processing goes on to a step S86.

At the step S86, the device-recognizing unit 66 extracts the address of a start point on a route, the address of an end point on a route and a requested bandwidth from the request indicated by arrow (1), reporting the addresses and the bandwidth to the route-finding unit 68. The route-finding unit 68 searches the topology sub-database for devices on routes matching the address of the start point on a route, the address of the end point on a route and the requested bandwidth, which are used as search keys of the search operation. The route-finding unit 68 then informs the device-recognizing unit 66 of the devices found in the search operation. In this example, since the request specifies a bandwidth of 10 Mb/s for routes from the communication terminal 49#111 to the communication terminal 49#151, a route from the relay apparatus 50#11 to the relay apparatus 50#12 and a route from the relay apparatus 50#12 to the relay apparatus 50#15 are found and reported to the device-recognizing unit 66.

At the step S88, the device-recognizing unit 66 creates device-setting information to be transmitted to devices and supplies the information to the request & information-transmitting unit 69. In this example, the device-recognizing unit 66 creates pieces of device-setting information to be transmitted to the relay apparatus 50#11, the relay apparatus 50#12 and the relay apparatus 50#15 as indicated by arrows (2), (3) and (4) respectively in FIG. 25. At the step S90, the request & information-transmitting unit 69 transmits the pieces of device-setting information to the devices. To be more specific, the request & information-transmitting unit 69 transmits the pieces of device-setting information to the relay apparatus 50#11, the relay apparatus 50#12 and the relay apparatus 50#15 as indicated by arrows (2), (3) and (4) respectively in FIG. 24. The relay apparatus 50#11 sets a route in accordance with the device-setting information (2). Thus, when the relay apparatus 50#11 receives communicated data destined for the communication terminal 49#151, the relay apparatus 50#11 passes on the data to the relay apparatus 50#12. In the same way, the relay apparatus 50#12 sets a route in accordance with the device-setting information (3). Thus, when the relay apparatus 50#12 receives communicated data destined for the communication terminal 49#151, the relay apparatus 50#12 passes on the data to the relay apparatus 50#15. By the same token, the relay apparatus 50#15 sets a route in accordance with the device-setting request (4). Thus, when the relay apparatus 50#15 receives communicated data destined for the communication terminal 49#151, the relay apparatus 50#11 passes on the data to the communication terminal 49#151.

2-2: Description of operations for a case in which the address of a start point is the address of a device in an area controlled by the network control unit but the address of an end point is not the address of a device in the area—Part (1)

Figure 26:
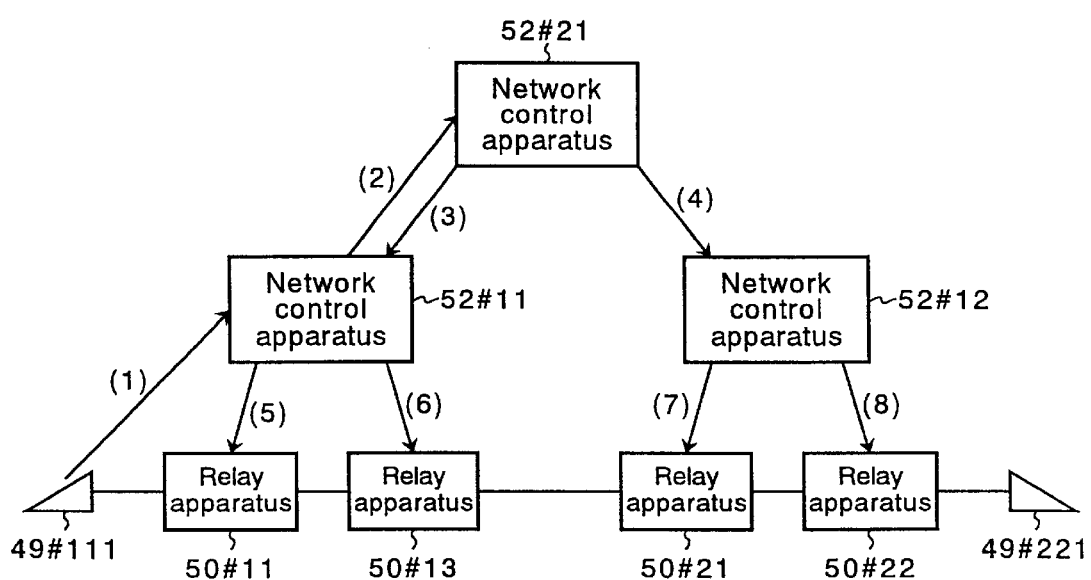
FIG. 26 is an explanatory diagram showing an operation of a first case in which the address of a start point is the address of a device in an area controlled by the network control unit but the address of an end point is not the address of a device in the area.
Figure 27:
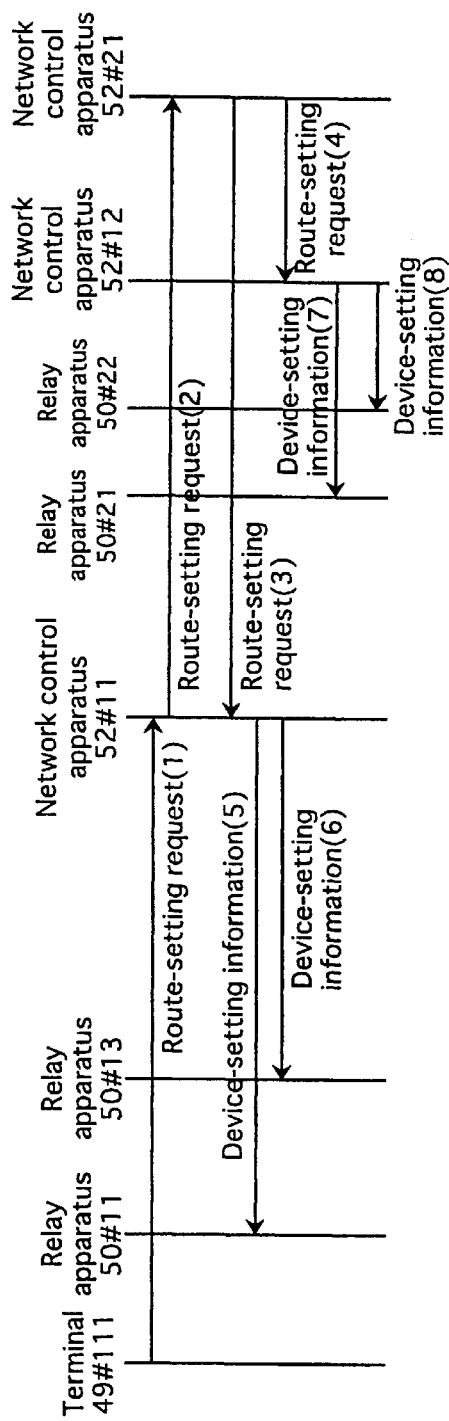
FIG. 27 is a sequence chart of the first case in which the address of a start point is the address of a device in its area but the address of an end point is not the address of a device in its area.

The following description explains a case in which there is a request for a bandwidth of 10 Mb/s from a communication terminal 49#111 connected to a relay apparatus 50#11 located in the first area to a communication terminal 49#221 connected to a relay apparatus 50#22 located in the second area. FIG. 26 is an explanatory diagram showing an operation of a case in which the address of a start point is the address of a device in an area controlled by the network control unit but the address of an end point is not the address of a device in the area. FIG. 27 is a sequence chart of the case, the operation of which is shown in FIG. 26. As shown in FIGS. 26 and 27, the communication terminal 49#111 transmits a request for setting of routes indicated by arrow (1) in FIG. 26 to the network control apparatus 52#11. The request specifies the address of the communication terminal 49#111 as the address of a start point, the address of the communication terminal 49#221 as the address of an end point, the address of the communication terminal 49#221 as the address of a communication destination and a bandwidth of 10 Mb/s. The request-receiving unit 60 employed in the communication network app 52#11 receives the request for setting of routes indicated by arrow (1) and passes on the request to the request-range-judging unit 62. Since the address of an end point is not located in an area controlled by this network control apparatus 52#11, the request-range-judging unit 62 passes on the request (1) for setting of routes to the request-transmitting unit 64. The request-transmitting unit 64 passes on the request (1) to the network control apparatus 52#21 as a request for setting of routes as indicated by arrow (2) in FIG. 26.

The route-finding unit 68 employed in the network control apparatus 52#21 searches the topology sub-database for devices on routes matching the address of a start point on a route, the address of an end point on a route and the requested bandwidth, which are specified in the route-setting request (2) and used as search keys of the search operation. The route-finding unit 68 then informs the device-recognizing unit 66 of the devices found in the search operation. In this example, since the request specifies a bandwidth of 10 Mb/s for routes from the address of the communication terminal 49#111 in the first area to the address of the communication terminal 49#221 in the second area, a route from a relay apparatus 50#13 in the first area to a relay apparatus 50#21 in the second area is found and reported to the device-recognizing unit 66.

The device-recognizing unit 66 creates device-setting information to be transmitted to devices, and supplies the information to the request & information-transmitting unit 69. In this example, the device-recognizing unit 66 forms device-setting information (3), which includes the address of the communication terminal 49#111 as the address of a start point, the address of the relay apparatus 50#21 as the address of an end point, the address of the communication terminal 49#221 as the address of a communication destination and a bandwidth of 10 Mb/s. In addition, the device-recognizing unit 66 also forms device-setting information (4), which includes the address of the relay apparatus 50#21 as the address of a start point, the address of the communication terminal 49#221 as the address of an end point, the address of the communication terminal 49#221 as the address of a communication destination and a bandwidth of 10 Mb/s. Then, the request & information-transmitting unit 69 transmits the pieces of device-setting information (3) and (4) to the network control apparatus 52#11 and the network control apparatus 52#12 respectively.

The network control apparatus 52#11 finds routes from the communication terminal 49#111 to the relay apparatus 50#21 in accordance with the device-setting information (3) in the same way as the operations described in Section 2-1. Then, the network control apparatus 52#11 transmits device-setting information (5) to the relay apparatus 50#11 and device-setting information (6) to the relay apparatus 50#13. On the other hand, the network control apparatus 52#12 finds routes from the relay apparatus 50#21 to the communication terminal 49#221 in accordance with the device-setting information (4) in the same way as the operations described in Section 2-1. Then, the network control apparatus 52#12 transmits device-setting information (7) to the relay apparatus 50#21 and device-setting information (8) to the relay apparatus 50#22.

It should be noted that the pieces of device-setting information (3) and (4) transmitted from the upper-level network control apparatus 52#21 to the lower-level network control apparatuses 52#11 and 52#12 respectively are each also referred to a device-setting request in order to distinguish the pieces device-setting information (3) and (4) from the pieces of device-setting information (5), (6), (7) and (8) transmitted to the relay apparatuses 50#11, 50#13, 50#21 and 50#22 respectively.

2-3: Description of operations for a case in which the address of a start point is the address of a device in an area controlled by the network control apparatus but the address of an end point is not the address of a device in the area—Part (2)

Figure 28:
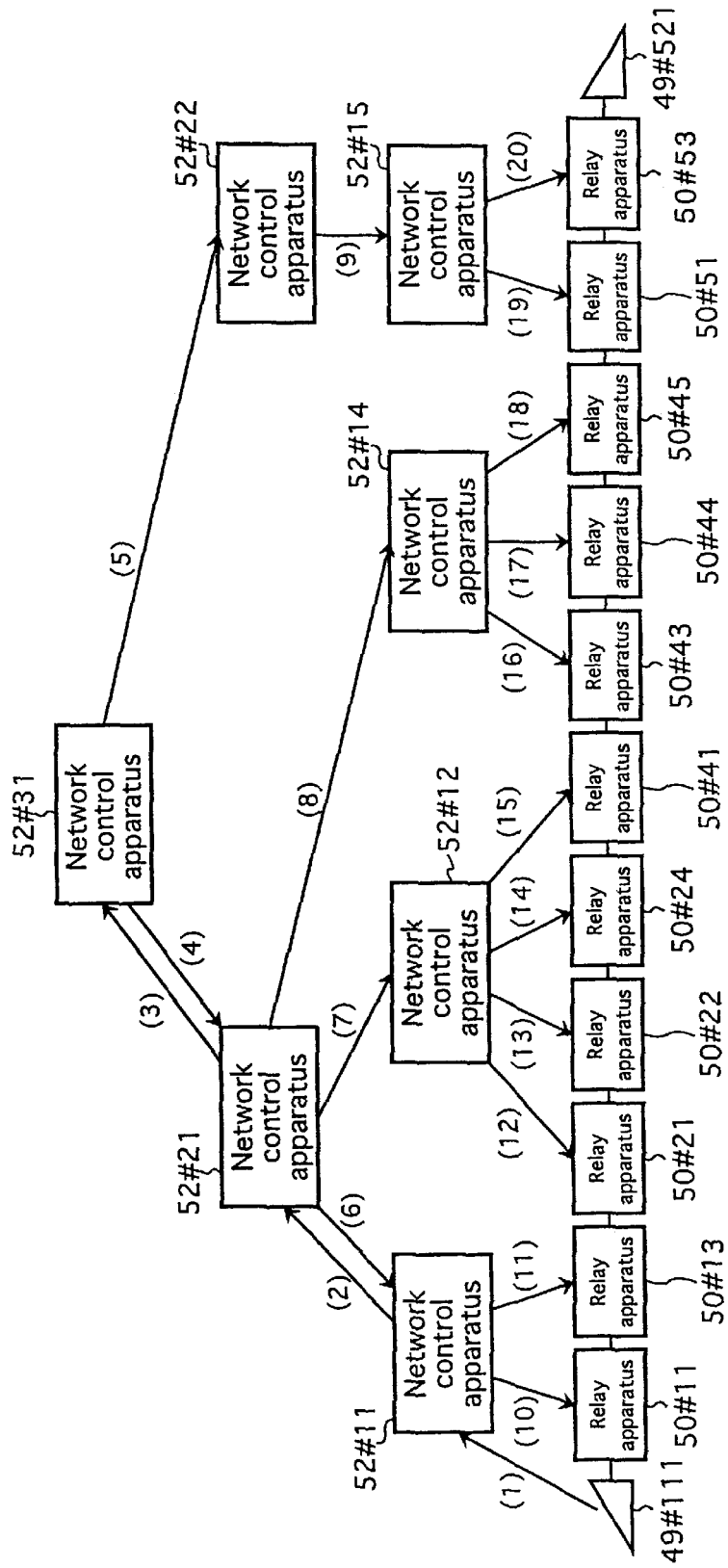
FIG. 28 is an explanatory diagram showing an operation of a first case in which the address of a start point is the address of a device in an area controlled by the network control unit but the address of an end point is not the address of a device in the area.

In the transmission of data described in Section 22, communications between the network control apparatus 52#11 and the upper-level network control apparatus 52#21 are entailed, involving network control apparatuses at 2 hierarchical levels. This section describes a transmission of data that requires not only communications between the network control apparatus 52#11 and the upper-level network control apparatus 52#21 but also communications between the upper-level network control apparatus 52#21 and a further upper-level network control apparatus 52#31 as shown in FIG. 28, involving network control apparatuses at 3 hierarchical levels.

The following description explains a case in which there is a request for a bandwidth of 10 Mb/s from a communication terminal 49#111 connected to a relay apparatus 50#11 located in the first area to a communication terminal 49#531 connected to a relay apparatus 50#53 located in the fifth area. FIG. 28 is an explanatory diagram showing an operation of a case in which the address of a start point is the address of a device in an area controlled by the network control apparatus but the address of an end point is not the address of a device in the area. FIG. 29 is a sequence chart of the case, the operation of which is shown in FIG. 28. As shown in FIGS. 28 and 29, the communication terminal 49#111 transmits a request for setting of routes indicated by arrow (1) in FIG. 28 to the network control apparatus 52#11. The request (1) specifies the address of the communication terminal 49#111 as the address of a start point, the address of the communication terminal 49#531 as the address of an end point, the address of the communication terminal 49#531 as the address of a communication destination and a bandwidth of 10 Mb/s. Since the address of the communication terminal 49#531 serving as an end point as specified in the request (1) is not located in an area controlled by this network control apparatus 52#11, the network control apparatus 52#11 passes on the request (1) to the network control apparatus 52#21 as a request for setting of routes as indicated by arrow (2) in FIG. 28. By the same token, since the address of the communication terminal 49#531 serving as an end point as specified in the request (2) is not located in the first to fourth areas controlled by this network control apparatus 52#21 either, the network control apparatus 52#21 passes on the request (2) to the network control apparatus 52#31 as a request for setting of routes as indicated by arrow (3) in FIG. 28.

To the network control apparatus 52#31, the address of the communication terminal 49#111 serving as a start point is in a merge area 11 comprising the first to fourth areas whereas the address of the communication terminal 49#531 serving as an end point is in a merge area 12 comprising the fifth to eighth areas. Thus, the network control apparatus 52#31 finds routes passing through the merge areas 11 and 12.

In this example, the network control apparatus 52#31 finds routes between a relay apparatus 50#44 and a relay apparatus 50#51. The network control apparatus 52#31 then transmits a device-setting request indicated by arrow (4) in FIG. 28 to the network control apparatus 52#21 controlling the merge area 11. The device-setting request (4) includes the address of the communication terminal 49#111 as the address of a start point, the address of the relay apparatus 50#51 as the address of an end point, the address of the communication terminal 49#531 as the address of a communication destination and a bandwidth of 10 Mb/s. In addition, the network control apparatus 52#31 also transmits a device-setting request indicated by arrow (5) in FIG. 28 to a network control apparatus 52#22 controlling the merge area 12. The device-setting request (5) includes the address of the relay apparatus 50#51 as the address of a start point, the address of the communication terminal 49#531 as the address of an end point, the address of the communication terminal 49#531 as the address of a communication destination and a bandwidth of 10 Mb/s.

The network control apparatus 52#21 finds a route from the first area to a relay apparatus 50#21, a route from the relay apparatus 50#21 to the second area, a route from the second area to a relay apparatus 50#41 and a route from the relay apparatus 50#41 to the fourth area on the basis of the device-setting request (4). Then, the network control apparatus 52#21 transmits a device-setting request (6) to the network control apparatus 52#11, which controls the first area including the requested routes. The device-setting request (6) includes the address of the communication terminal 49#111 as the address of a start point, the address of the relay apparatus 50#21 as the address of an end point, the address of the communication terminal 49#531 as the address of a communication destination and a bandwidth of 10 Mb/s. In addition, the network control apparatus 52#21 transmits a device-setting request (7) to the network control apparatus 52#12, which controls the second area including the requested routes. The device-setting request (7) includes the address of relay apparatus 50#21 as the address of a start point, the address of the relay apparatus 50#41 as the address of an end point, the address of the communication terminal 49#531 as the address of a communication destination and a bandwidth of 10 Mb/s. The network control apparatus 52#21 also transmits a device-setting request (8) to the network control apparatus 52#14, which controls the fourth area including the requested routes. The device-setting request (8) includes the address of the relay apparatus 50#41 as the address of a start point, the address of the relay apparatus 50#51 as the address of an end point, the address of the communication terminal 49#531 as the address of a communication destination and a bandwidth of 10 Mb/s.

By the same token, the network control apparatus 52#22 finds routes from the relay apparatus 50#51 to the communication terminal 49#531 through the fifth area on the basis of the device-setting request (5). The network control apparatus 52#22 then transmits a device-setting request (9) to the network control apparatus 52#15, which controls the fifth area including the requested routes. The device-setting request (9) includes the address of the relay apparatus 50#51 as the address of a start point, the address of the communication terminal 49#531 as the address of an end point, the address of the communication terminal 49#531 as the address of a communication destination and a bandwidth of 10 Mb/s.

The network control apparatus 52#11 receives the device-setting request (6), transmitting device-setting information (10) to the relay apparatus 50#11 and device-setting information (11) to the relay apparatus 50#13 in the same way as the operations described in Section 2-2. Also in the same way as the operations described in Section 2-2, the network control apparatus 52#12 receives the device-setting request (7), transmitting device-setting information (12) to the relay apparatus 50#21, and device-setting information (13) to the relay apparatus 50#22 and device-setting information (14) to the relay apparatus 50#24. By the same token, the network control apparatus 52#14 receives the device-setting request (8), transmitting device-setting information (15) to the relay apparatus 50#41, device-setting information (16) to the relay apparatus 50#43, device-setting information (17) to the relay apparatus 50#44 and device-setting information (18) to the relay apparatus 50#45. Likewise, the network control apparatus 52#15 receives the device-setting request (9), transmitting device-setting information (19) to the relay apparatus 50#51 and device-setting information (20) to the relay apparatus 50#52.

As a result of the processing described above, routes are set between the communication terminal 49#111 and the communication terminal 49#531. Since the network control apparatuses compute the routes from a hierarchical topology, the processing load borne by each network control apparatus to find the routes is reduced even if the communication network becomes large in scale. In addition, since topology sub-databases included in the network control apparatuses are organized to form a hierarchical structure, the amount of stored communication network information, the magnitude of a processing load to find routes and the number of linked connections in each network control apparatus do not rise even if the scale of the communication network becomes large.

Second Embodiment

Figure 30:
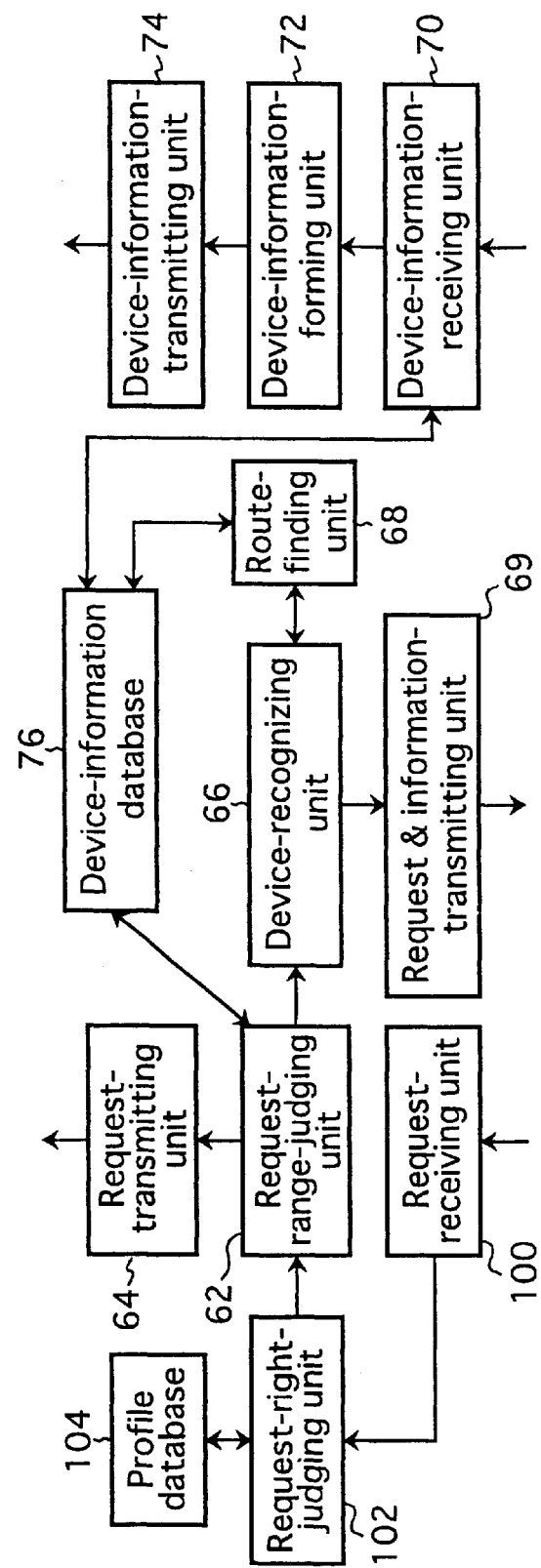
FIG. 30 is a functional block diagram showing a network control apparatus implemented by a second embodiment of the present invention.

FIG. 30 is a functional block diagram showing a network control apparatus implemented by a second embodiment of the present invention. Components of the second embodiment virtually identical with those employed in the first embodiment shown in FIG. 5 are denoted by the same reference numerals as the first embodiment. The second embodiment is different from the first embodiment in that, in the case of the network control apparatus implemented by the second embodiment, there are provided a device-profile database and a user-profile database used respectively for storing information for identifying a device and a user making a request for setting of routes. A network control apparatus identifies a device or a user making a request for setting of routes by checking the device-profile database and the user-profile database respectively in order to form a judgment as to whether or not to process the request. As shown in FIG. 30, a network control apparatus comprises a request-receiving unit 100, a request-range-judging unit 62, a request-transmitting unit 64, a device-recognizing unit 66, a route-finding unit 68, a request & information-transmitting unit 69, a device-information-receiving unit 70, a device-information-forming unit 72, a device-information-transmitting unit 74, a device-information database 76, a request-right-judging unit 102 and a profile database 104.

The request-receiving unit 100 receives a request for setting of routes and passes on the request to the request-right-judging unit 102. The request-right-judging unit 102 extracts identification information from the request for setting of routes. The identification information is used for identifying a device or a user making a request for setting of routes. The request-right-judging unit 102 checks the identification information against the profile database 104 to form a judgment as to whether or not the device or the user indicated by the identification information has a right to make a request for setting of routes. If the outcome of the judgment indicates that the device or the user indicated by the identification information has a right to make a request for setting of routes, the request is passed on to the request-range-judging unit 62. If the outcome of the judgment indicates that the device or the user indicated by the identification information does not have a right to make a request for setting of routes, on the other hand, the request is discarded. The profile database 104 is a database for storing profiles of devices and users each having a right to make a request for setting of routes.

Figure 31:
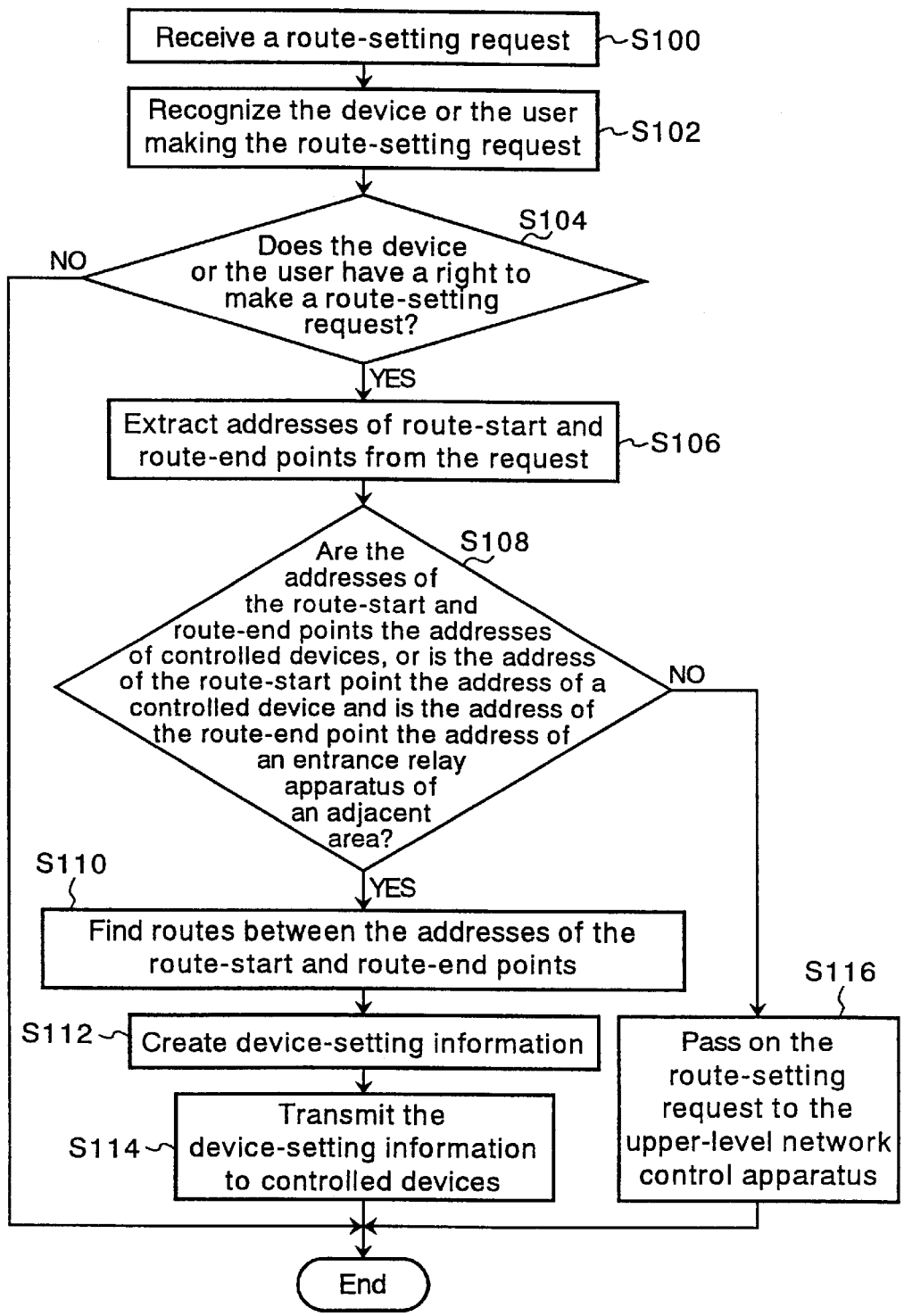
FIG. 31 is a flowchart representing operations carried out by a request-receiving unit, a route-request-right-judging unit, a request-range-judging unit, a request-transmitting unit, a route-finding unit, a request & information-transmitting unit and a device-recognizing unit, which are employed in the network control apparatus shown in FIG. 30.

FIG. 31 is a flowchart representing operations carried out by the request-receiving unit 100, the request-right-judging unit 102, the request-range-judging unit 62, the request-transmitting unit 64, the route-finding unit 68, the request & information-transmitting unit 69 and the device-recognizing unit 66, which are employed in the network control apparatus shown in FIG. 30.

Next, the operation of the network control apparatus implemented by the second embodiment is explained by referring to the flowchart shown in FIG. 31. The flowchart shown in FIG. 31 begins with a step S100 at which the request-receiving unit 100 receives a request for setting of routes and passes on the request to the request-right-judging unit 102. At the next step S102, the request-right-judging unit 102 extracts identification information from the request for setting of routes. The identification information is used for identifying a device or a user making a request for setting of routes. At the next step S104, the request-right-judging unit 102 checks the identification information against the profile database 104 to form a judgment as to whether or not the device or the user indicated by the identification information has a right to make a request for setting of routes. If the outcome of the judgment indicates that the device or the user indicated by the identification information has a right to make a request for setting of routes, the request is passed on to the request-range-judging unit 62. Then, the flow of the processing goes on to a step S106. If the outcome of the judgment indicates that the device or the user indicated by the identification information does not have a right to make a request for setting of routes, on the other hand, the request is discarded and the processing is ended. Since pieces of processing carried out at the step S106 to a step S116 are respectively the same as those performed at the steps S82 to S92 of the flowchart shown in FIG. 23, it is not necessary to repeat their explanation.

As described above, in addition to the effects provided by the first embodiment, the second embodiment checks a device and a user making a request for setting of routes to form a judgment as to whether or not the device and the user have a right to make such a right. As a result, the reliability of the communication network is improved.

Third Embodiment

Figure 32:
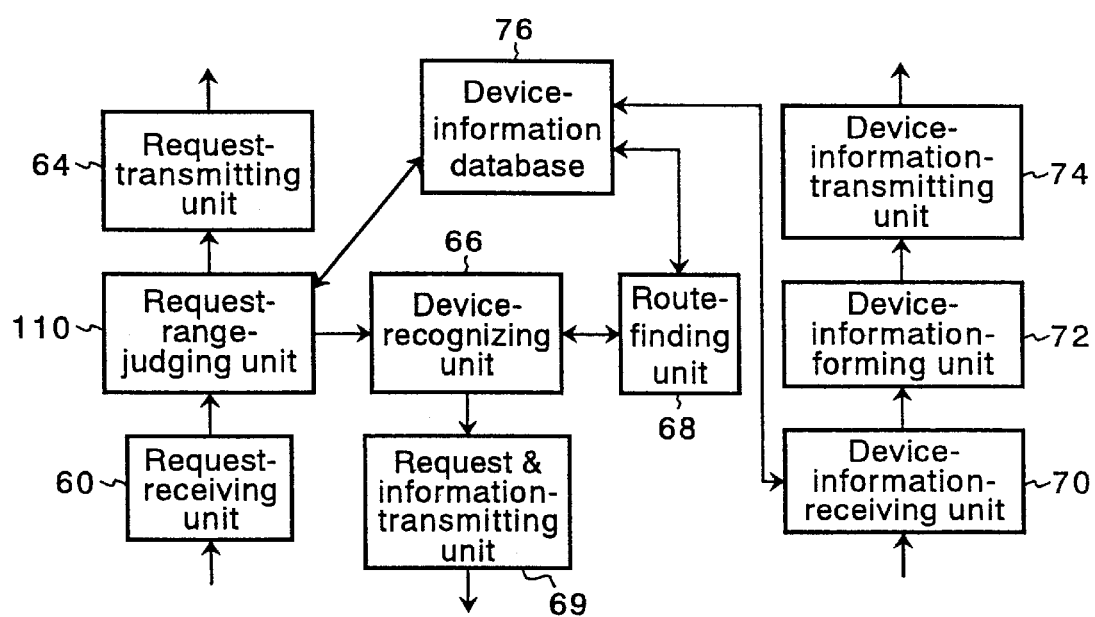
FIG. 32 is a functional block diagram showing a network control apparatus implemented by a third embodiment of the present invention.

FIG. 32 is a functional block diagram showing a network control apparatus implemented by a third embodiment of the present invention. Components of the third embodiment virtually identical with those employed in the first embodiment shown in FIG. 5 are denoted by the same reference numerals as the first embodiment. The third embodiment is different from the first embodiment in that the network control apparatus implemented by the third embodiment is capable of distinguishing a request for setting of routes received from a communication terminal, a relay apparatus, a console and a lower-level network control apparatus, which are controlled by the network control apparatus at this hierarchical level, from a request for setting of routes (also referred to as device-setting information in Section 2-2) received from an upper-level controlling network control apparatus by evaluating the value of a flag stored in the request or the device-setting information while, in the case of the first embodiment, requests for setting of routes received from a communication terminal, a relay apparatus, a console and a lower-level network control apparatus, which are controlled by the network control apparatus at this hierarchical level, a request for setting of routes (or device-setting information) received from an upper-level controlling network control apparatus as well as device-setting information transmitted to a relay apparatus all have a uniform format. By using such a flag, a network control apparatus implemented by the third embodiment is capable of readily recognizing a request for setting of routes (or device-setting information) received from an upper-level controlling network control apparatus, hence, being guaranteed that the addresses of start and end points specified in the request or information are located in an area controlled by the network control apparatus. It is thus unnecessary to form a judgment as to whether or not the addresses of start and end points specified in the request or information are located in an area controlled by the network control apparatus. That is to say, the formation of such a judgment can be skipped. As a result, the process of finding routes can be carried out faster.

As shown in FIG. 32, a network control apparatus comprises a request-receiving unit 60, a request-range-judging unit 110, a request-transmitting unit 64, a device-recognizing unit 66, a route-finding unit 68, a request & information-transmitting unit 69, a device-information-receiving unit 70, a device-information-forming unit 72, a device-information-transmitting unit 74 and a device-information database 76.

FIG. 33 is a diagram showing the basic format of a request for setting of routes. As shown in FIG. 33, the request for setting of routes includes an area at a predetermined location for storing a communication identification flag used for distinguishing a request for setting of routes received from a communication terminal, a relay apparatus, a console and a lower-level network control apparatus, which are controlled by the network control apparatus at this hierarchical level, from a request for setting of routes (or device-setting information) received from an upper-level controlling network control apparatus. Typically, a communication identification flag set at 1 indicates that the request for setting of routes is a request for setting of routes (or device-setting information) received from an upper-level controlling network control apparatus. On the other hand, a communication identification flag reset to 0 indicates that the request for setting of routes is a request received from a communication terminal, a relay apparatus, a console and a lower-level network, which are controlled by the network control apparatus at this hierarchical level. The request-range-judging unit 110 fetches the communication identification flag from a request for setting of routes. If the request for setting of routes is determined to be a request for setting of routes (or device-setting information) received from an upper-level controlling network control apparatus, the request is passed on to the device-recognizing unit 66. If the request for setting of routes is a request received from a communication terminal, a relay apparatus, a console or a lower-level network control apparatus under control, on the other hand, the request-range-judging unit 110 carries out the same processing as the request-range-judging unit 62 employed in the network control apparatus shown in FIG. 5. Otherwise, the third embodiment is identical with the first embodiment.

Figure 34:
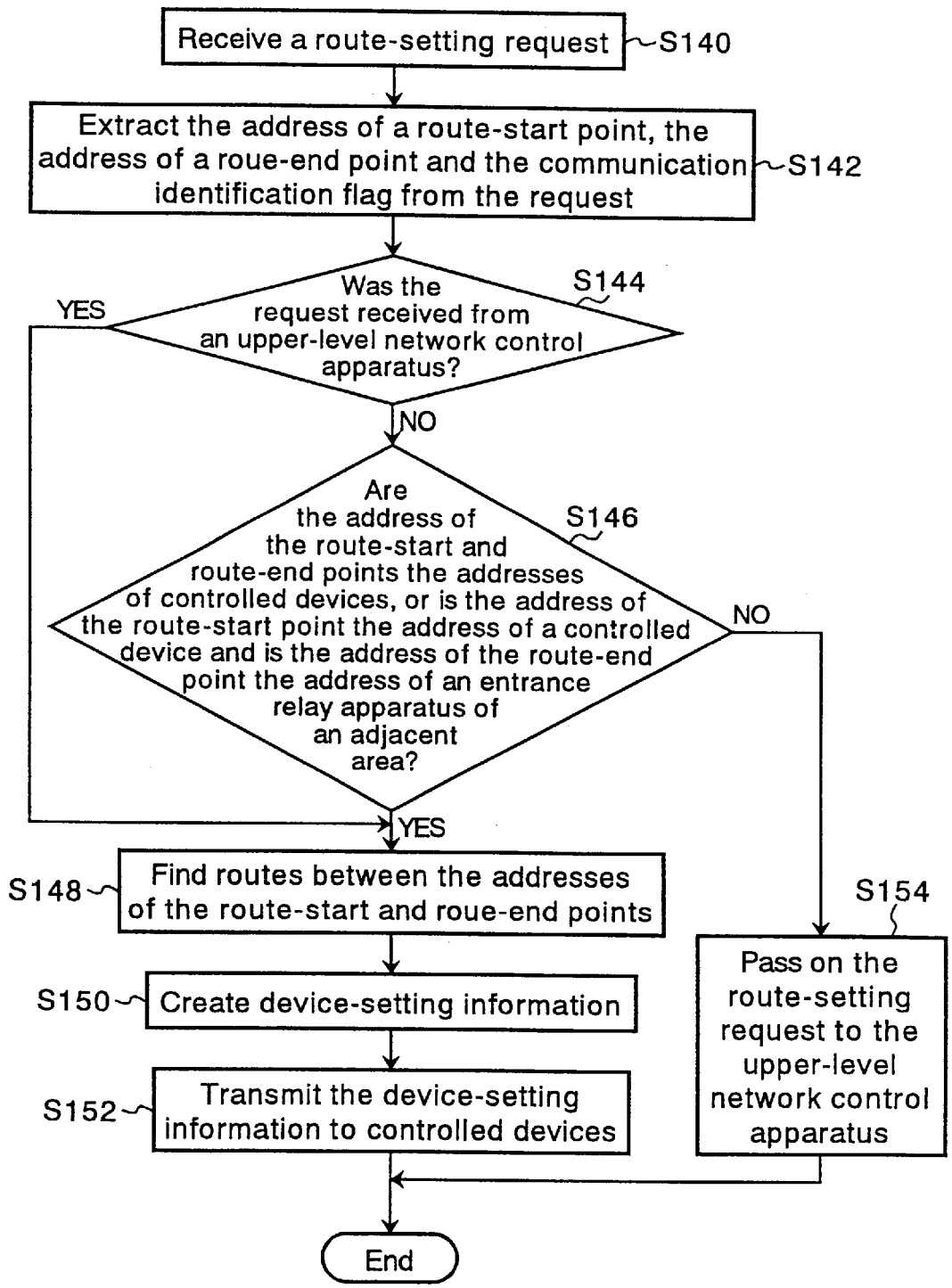
FIG. 34 is a flowchart representing operations carried out by a request-receiving unit, a request-range-judging unit, a request-transmitting unit, a route-finding unit, a request & information-transmitting unit and a device-recognizing unit, which are employed in the network control apparatus shown in FIG. 32.

FIG. 34 is a flowchart representing operations carried out by the request-receiving unit 60, the request-range-judging unit 110, the request-transmitting unit 64, the route-finding unit 68, the request & information-transmitting unit 69 and the device-recognizing unit 66, which are employed in the network control apparatus shown in FIG. 32.

Next, the operation of the network control apparatus implemented by the third embodiment is explained by referring to the flowchart shown in FIG. 34. The flowchart shown in FIG. 34 begins with a step S140 at which the request-receiving unit 60 receives a request for setting of routes and passes on the request to the request-range-judging unit 110. At the next step S142, the request-range-judging unit 110 extracts a communication identification flag, the address of a start point and the address of an end point from the request for setting of routes. At the next step S144, the request-range-judging unit 110 forms a judgment as to whether or not the request for setting of routes is a request for setting of routes (or device-setting information) received from an upper-level controlling network control apparatus. If the outcome of the judgment indicates that the request for setting of routes is a request for setting of routes (or device-setting information) received from an upper-level controlling network control apparatus, the request is passed on to the device-recognizing unit 66 and the flow of the processing then goes on to a step S148. If the outcome of the judgment indicates that the request for setting of routes is a request received from a communication terminal, a relay apparatus, a console or a lower-level network control apparatus, which is controlled by the network control apparatus at this hierarchical level, on the other hand, the request is passed on to the device-recognizing unit 66 and the flow of the processing then goes on to a step S146. Since pieces of processing carried out at the step S146 to a step S154 are respectively the same as those performed at the steps S84 to S92 of the flowchart shown in FIG. 23, it is not necessary to repeat their explanation.

As described above, in addition to the effects provided by the first embodiment, the third embodiment forms a judgment as to whether or not a request for setting of routes is a request for setting of routes (or device-setting information) received from an upper-level controlling network control apparatus. If the outcome of the judgment indicates that the request for setting of routes is a request for setting of routes (or device-setting information) received from an upper-level controlling network control apparatus, the addresses of start and end points specified in the request or information are guaranteed to be addresses located in an area controlled by the network control apparatus. It is thus unnecessary to form a judgment as to whether or not the addresses of start and end points specified in the request or information are located in an area controlled by the network control apparatus. That is to say, the formation of such a judgment can be skipped. As a result, the process of finding routes can be carried out faster. In this embodiment, a communication identification flag is provided for distinguishing a request for setting of routes received from a communication terminal, a relay apparatus, a console and a lower-level network control apparatus, which are controlled by the network control apparatus at this hierarchical level, from a request for setting of routes (or device-setting information) received from an upper-level controlling network control apparatus as described above. It should be noted, however, that as an alternative, a request for setting of routes received from a communication terminal, a relay apparatus, a console or a lower-level network control apparatus, which are controlled by the network control apparatus at this hierarchical level, can be set in a format different from a request for setting of routes (or device-setting information) received from an upper-level controlling network control apparatus. In this case, the format is checked to form a judgment as to whether or not a request for setting of routes is a request for setting of routes (or device-setting information) received from an upper-level controlling network control apparatus. If the outcome of the judgment indicates that the request for setting of routes is a request for setting of routes (or device-setting information) received from an upper-level controlling network control apparatus, the addresses of start and end points specified in the request or information are guaranteed to be addresses located in an area controlled by the network control apparatus. It is thus unnecessary to form a judgment as to whether or not the addresses of start and end points specified in the request or information are located in an area controlled by the network control apparatus. That is to say, the formation of such a judgment can be skipped.

Fourth Embodiment

Figure 35:
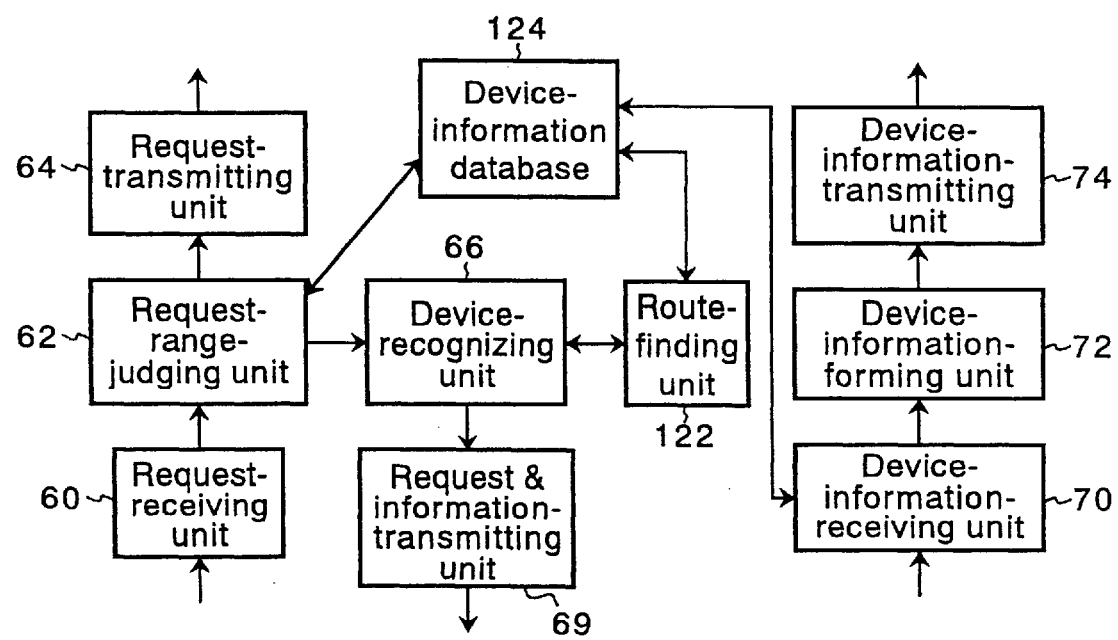
FIG. 35 is a functional block diagram showing a network control apparatus implemented by a fourth embodiment of the present invention.

FIG. 35 is a functional block diagram showing a network control apparatus implemented by a fourth embodiment of the present invention. Components of the fourth embodiment virtually identical with those employed in the first embodiment shown in FIG. 5 are denoted by the same reference numerals as the first embodiment. In order to distribute the transmission load, the fourth embodiment allows a plurality of different routes connecting a start point to an end point to be set. As shown in FIG. 35, a network control apparatus comprises a request-receiving unit 60, a request-range-judging unit 62, a request-transmitting unit 64, a device-recognizing unit 66, a route-finding unit 122, a request & information-transmitting unit 69, a device-information-receiving unit 70, a device-information-forming unit 72, a device-information-transmitting unit 74, and a device-information database 124. In order to distribute the transmission load, a request for setting of a plurality of different routes connecting a start point to an end point is implemented by issuing the same request specifying the addresses of the same start and end points the same plurality of times. As an alternative, a request for setting of a plurality of different routes connecting a start point to an end point is implemented by issuing a single request specifying the same plurality of bandwidths. In this embodiment, the former technique is adopted to set a plurality of routes. The route-finding unit 122 refers to a route-management sub-database stored in the device-information database 124 to form a judgment as to whether or not a plurality of routes have already been set between the addresses of the same start and end points. If the outcome of the judgment indicates that a plurality of routes have already been set between the addresses of the same start and end points, a route satisfying a request for setting of routes different from the already set routes is found and cataloged into the route-management sub-database.

FIG. 36 is a diagram showing the configuration of a route-management sub-database in a device-information database 124 employed in the network control apparatus shown in FIG. 35. The route-management sub-database is a database for storing information on already set routes. As shown in FIG. 36, the route-management sub-database includes the address of a transmission source or the address of a start point and the address of a transmission destination or the address of an end point, which are specified in a request for setting of routes. In addition, the route-management sub-database also includes addresses of relay apparatuses on routes already set between the address of a transmission source or the address of a start point and the address of a transmission destination or the address of an end point.

Figure 37:
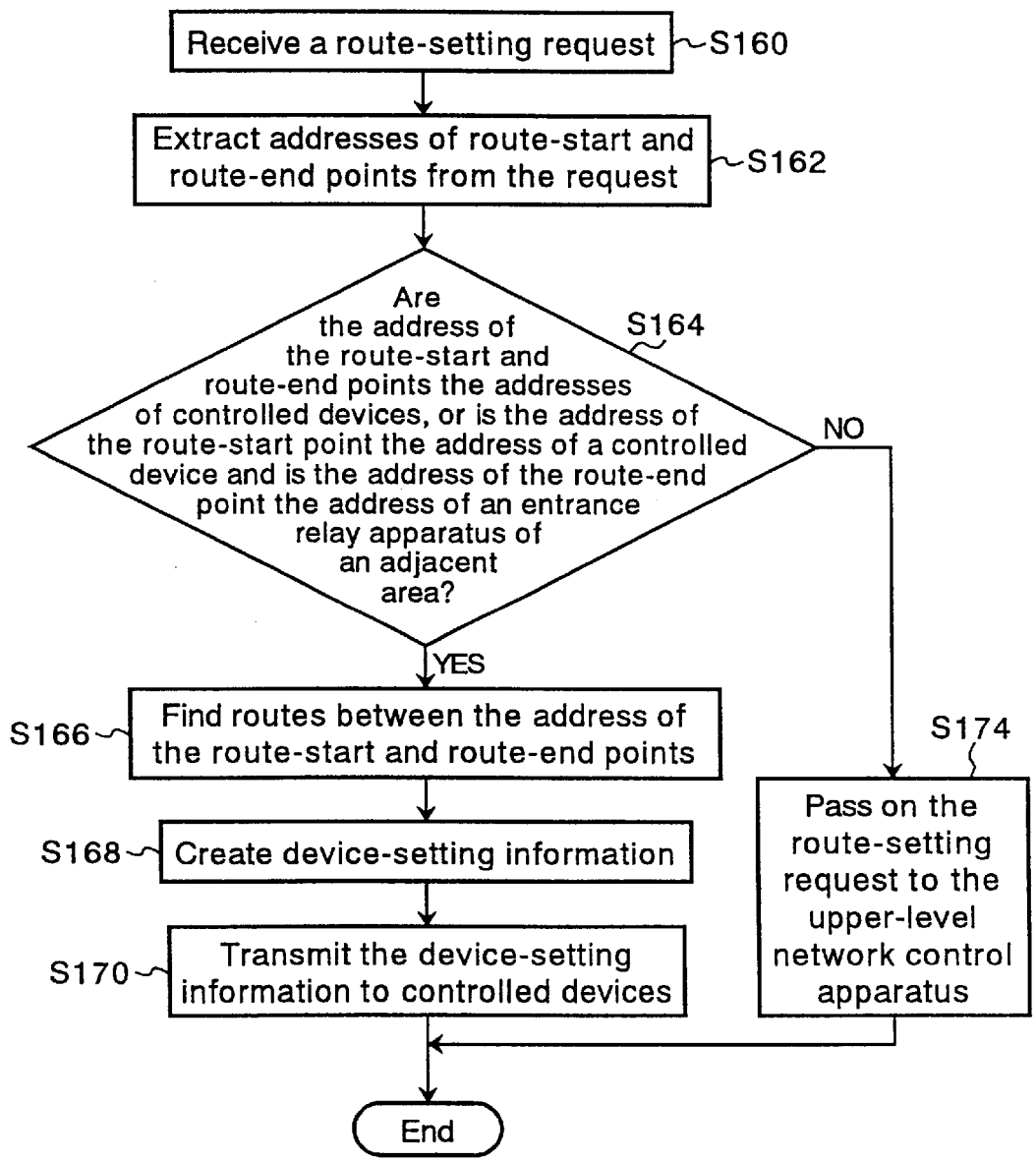
FIG. 37 is a flowchart representing operations carried out by a request-receiving unit, a request-range-judging unit, a request-transmitting unit, a device-recognizing unit, a route-finding unit and a request & information-transmitting unit, which are employed in the network control apparatus shown in FIG. 35.

FIG. 37 is a flowchart representing operations carried out by the request-receiving unit 60, the request-range-judging unit 62, the request-transmitting unit 64, the device-recognizing unit 66, the route-finding unit 122 and the request & information-transmitting unit 69, which are employed in the network control apparatus shown in FIG. 35. Next, the operation of the network control apparatus implemented by the fourth embodiment is explained by referring to the flowchart shown in FIG. 37. Since pieces of processing carried out at the step S160 to a step S164 are respectively the same as those performed at the steps S80 to S84 of the flowchart shown in FIG. 23, it is not necessary to repeat their explanation. At a step S166, the route-finding unit 122 searches the route-management sub-database stored in the device-information database 124 for the address of a start point and the address of an end point, which are specified in a request for setting of routes, to form a judgment as to whether or not routes have already been set between the addresses of the same start and end points.

If the outcome of the judgment indicates that routes have already been set between the addresses of the same start and end points, the route-finding unit 122 searches the topology sub-database for devices on routes between the address of a start point and the address of an end point specified in the request other than the already set routes by using the address of a start point, the address of an end point and the bandwidth specified in the request as search keys. The route-finding unit 122 then stores the addresses of the devices found in the search into the route-management sub-database. If the outcome of the judgment indicates that no routes have not been set yet between the addresses of the same start and end points, on the other hand, the route-finding unit 122 searches the topology sub-database for devices on routes between the address of a start point and the address of an end point specified in the request by using the address of a start point, the address of an end point and the bandwidth specified in the request as search keys. The route-finding unit 122 then stores information such as the addresses of the devices in the search into the route-management sub-database. The results of the search operation are reported to the device-recognizing unit 66. Since pieces of processing carried out at the step S168 to a step S174 are the same as those performed at the steps S88 to S92 of the flowchart shown in FIG. 23, it is not necessary to repeat their explanation.

As described above, in addition to the effects provided by the first embodiment, the fourth embodiment allows a plurality of different routes to be set between the address of the same start point to the address of the same end point in order to distribute the transmission load.

Fifth Embodiment

Figure 38:
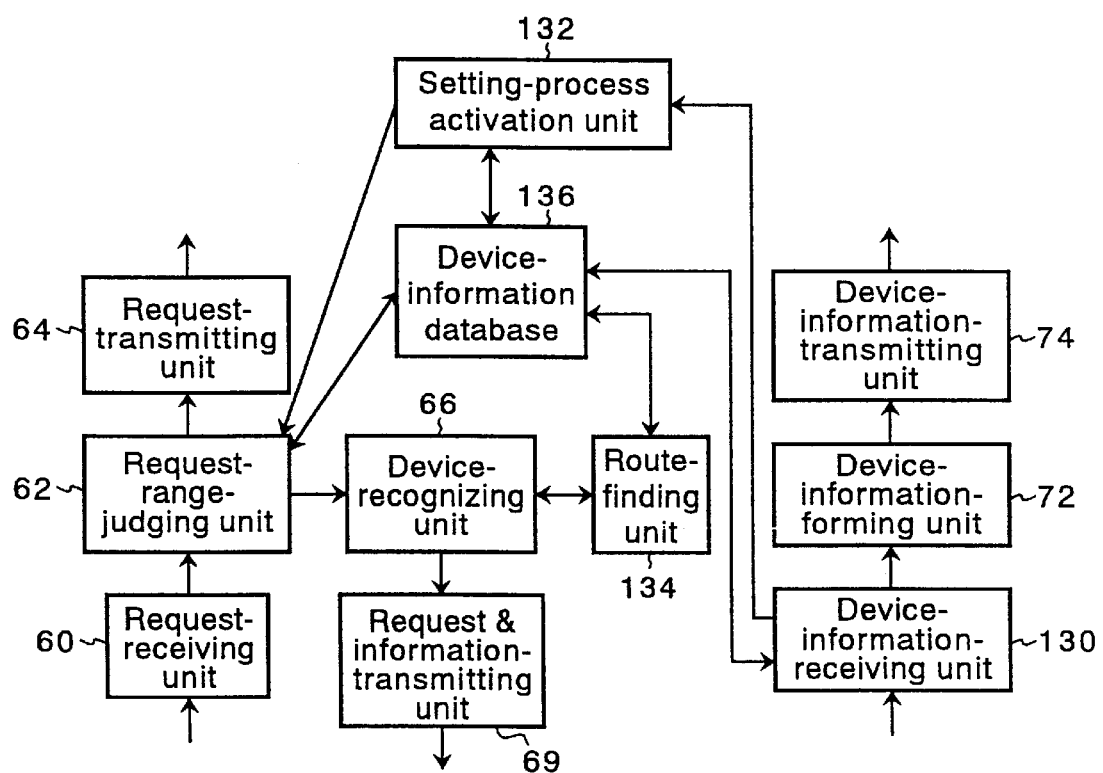
FIG. 38 is a functional block diagram showing a network control apparatus implemented by a fifth embodiment of the present invention.

FIG. 38 is a functional block diagram showing a network control apparatus implemented by a fifth embodiment of the present invention. Components of the fifth embodiment virtually identical with those employed in the first embodiment shown in FIG. 5 are denoted by the same reference numerals as the first embodiment. The network control apparatus implemented by the fifth embodiment forms a judgment as to whether or not a failure or congestion occurs in a relay apparatus on the communication network. If the outcome of the judgment indicates that a failure or congestion occurs, the network control apparatus spontaneously changes a route passing through the relay apparatus in which a failure or congestion occurs.

As shown in FIG. 38, the network control apparatus comprises a request-receiving unit 60, a request-range-judging unit 62, a request-transmitting unit 64, a device-recognizing unit 66, a route-finding unit 134, a request & information-transmitting unit 69, a device-information-receiving unit 130, a device-information-forming unit 72, a device-information-transmitting unit 74, a device-information database 136 and a setting-process activation unit 132. FIG. 39 is a diagram showing the format of third communication network information. Third communication network information is information for reporting the amount of traffic and/or failure status of a relay apparatus. As shown in the figure, the third communication network information comprises the address of a relay apparatus, the amount of traffic in the relay apparatus and/or the failure status of the relay apparatus. The device-information receiving unit 130 forms a judgment as to whether incoming information is first, second or third communication network information. If the outcome of the judgment indicates that the incoming information is first or second communication network information, processing is carried out in the same way as the first embodiment. If the outcome of the judgment indicates that the incoming information is third communication network information, on the other hand, the third communication network information is supplied to the setting-process activation unit 132.

The setting-process activation unit 132 examines the third communication network information in order to form a judgment as to whether the relay apparatus specified by the information is in a state of congestion or a state of failure. A typical indicator of a state of congestion is an amount of traffic exceeding a threshold value. If the outcome of the judgment indicates that the relay apparatus specified by the third communication network information is in a state of congestion or a state of failure, the setting-process activation unit 132 puts link information including the address of the relay apparatus in a state of congestion or a state of failure as the address of an adjacent node in congestion/failing status. Then, the setting-process activation unit 132 extracts all routes passing through the relay apparatus in a state of congestion or a state of failure from the route-management sub-database in the database 136 explained earlier in the description of the fourth embodiment. Then, the setting-process activation unit 132 supplies a request for setting of routes to the request-range-judging unit 62 along with the routes extracted from the route-management sub-database. The request specifies the address of a transmission source, the address of a transmission destination and a required bandwidth. The route-finding unit 134 searches the topology sub-database for routes connecting the address of the start point to the address of the end point by using the address of the start point, the address of the end point and the requested bandwidth as search keys. The routes found in the search must not include the routes extracted by the setting-process activation unit 132 from the route-management sub-database. The route-finding unit 134 also identifies devices on the routes found in the search. Finally, the route-finding unit 134 catalogs route-management information relevant to the routes found in the search in the route-management sub-database.

Figure 40:
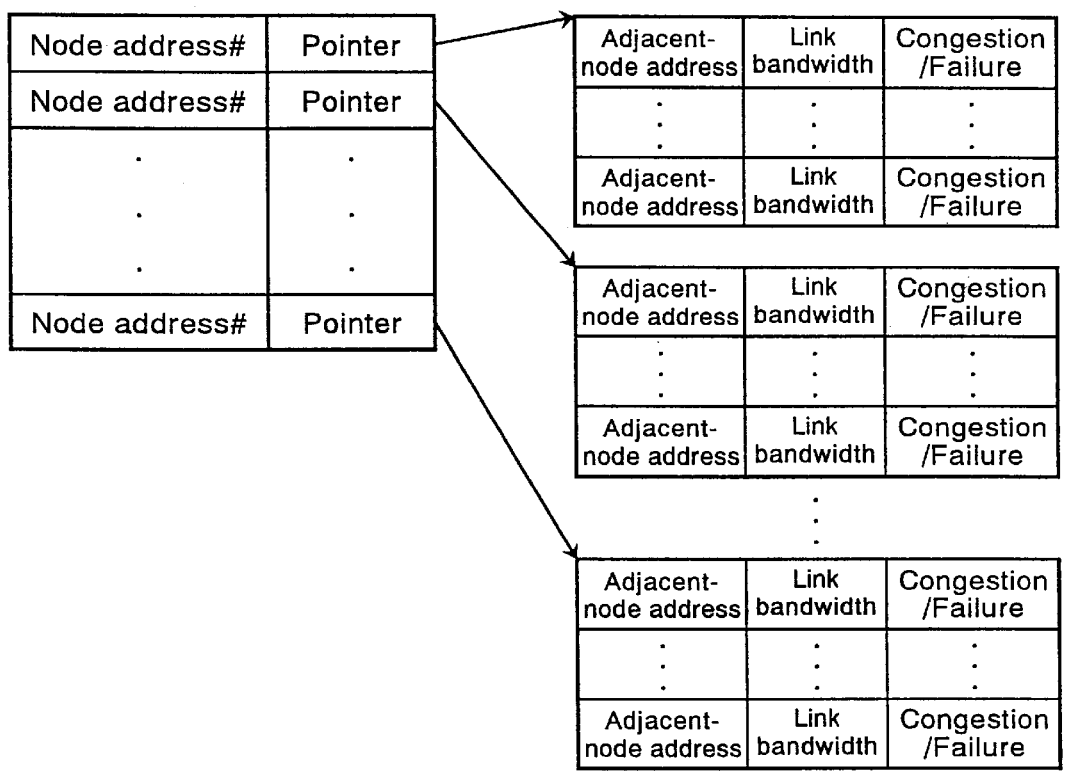
FIG. 40 is a diagram showing a topology sub-database stored in the device-information database employed in the network control apparatus shown in FIG. 38.

The device-information database 136 includes the device-list file, the topology sub-database and the route-management sub-database. The device-list file is virtually the same as that of the first embodiment whereas the route-management sub-database is the same as that employed in the fourth embodiment. FIG. 40 is a diagram showing the topology sub-database stored in the device-information database 136 employed in the network control apparatus shown in FIG. 38. In addition to information stored in the topology sub-database of FIG. 13 stored in the device-information database 76 employed in the network control apparatus shown in FIG. 5, the topology sub-database shown in FIG. 40 includes also information indicating a state of congestion, a state of failure or a normal state for each relay apparatus. To be more specific, in comparison with the topology sub-database shown in FIG. 13, information on each adjacent relay apparatus indicated by the address of the adjacent address includes a field for storing a state of congestion, a state of failure or a normal state of the adjacent relay communication apparatus.

Figure 41:
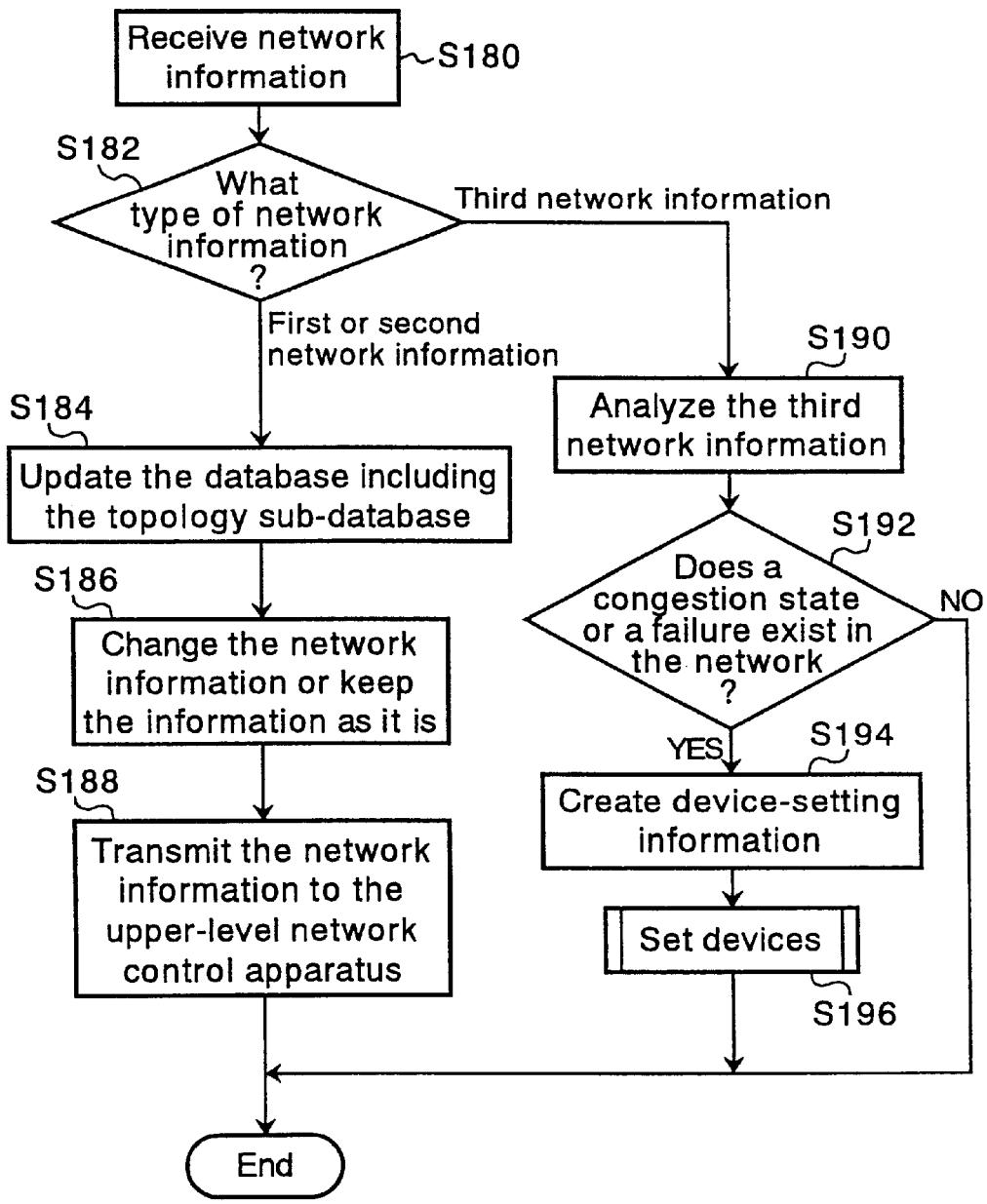
FIG. 41 is a flowchart representing operations carried out by a device-information-receiving unit, a device-information-forming unit, a device-information-transmitting unit, a setting-process-activating unit, a request-range-judging unit, a device-recognizing unit, a route-finding unit and a request & information-transmitting unit, which are employed in the network control apparatus shown in FIG. 38.

FIG. 41 is a flowchart representing operations carried out by the device-information-receiving unit 130, the device-information-forming unit 72, the device-information-transmitting unit 74, the setting-process-activation unit 132, the request-range-judging unit 62, the device-recognizing unit 66, the route-finding unit 134 and the request & information-transmitting unit 69, which are employed in the network control apparatus shown in FIG. 38. The following description explains processing carried out by a network control apparatus to identify a route including a relay apparatus in a state of congestion or a state of failure and sets another route to avoid the congestion and the failure.

The flowchart shown in FIG. 41 begins with a step S180 at which the device-information-receiving unit 130 receives network information. At the next step S182, the device-information receiving unit 130 forms a judgment as to whether the received network information is first, second or third network information. If the outcome of the judgment indicates that the received network information is first or second network information, the flow of the processing goes on to a step S184. If the outcome of the judgment indicates that the received network information is third network information, on the other hand, the third network information is passed on to the setting-process activation unit 132 and the flow of the processing then goes on to a step S190. Since pieces of processing carried out at the step S184 to a step S188 are the same as those performed at the steps S42 to S46 of the flowchart shown in FIG. 23, it is not necessary to repeat their explanation. At the step S190, the setting-process activation unit 132 analyzes the third network information. At the next step S192, the setting-process activation unit 132 forms a judgment as to whether or not the third network information indicates a state of congestion or a state of failure. A typical indicator of a state of congestion is an amount of traffic exceeding a threshold value. If the outcome of the judgment suggests that the third network information indicates a state of congestion or a state of failure, the flow of the processing goes on to a step S194. If the outcome of the judgment suggests that the third network information does not indicate a state of congestion or a state of failure, on the other hand, the processing is ended.

At the step S194, the setting-process activation unit 132 puts link information including the address of a relay apparatus in the state of congestion or the state of failure as the address of an adjacent node in the topology sub-database in congestion or failure status. The setting-process activation unit 132 then retrieves all routes passing through the relay apparatus in the state of congestion or the state of failure from the route-management sub-database of the device-information database 136. Subsequently, the setting-process activation unit 132 forms device-setting information (or a device-setting request) including the address of a transmission source as the address of a start point, the address of a transmission destination as the address of an end point and a set bandwidth as a requested bandwidth, supplying the information to the request-range-judging unit 62 along with the routes extracted from the route-management sub-database. The flow of the processing then goes on to a step S196.

Figure 42:
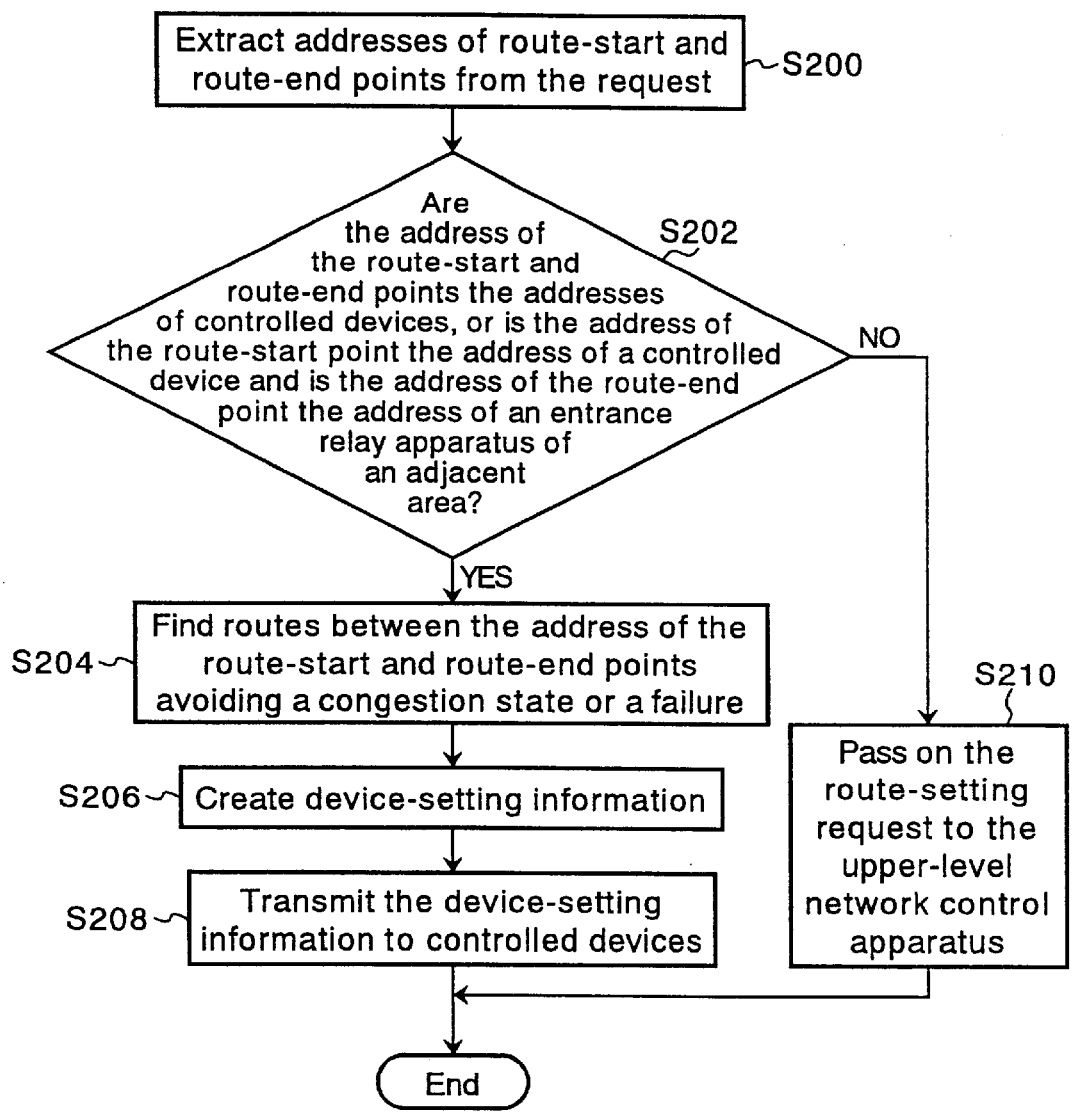
FIG. 42 is a flowchart representing details of a step S196 of the flowchart shown in FIG. 41.
Figure 43:
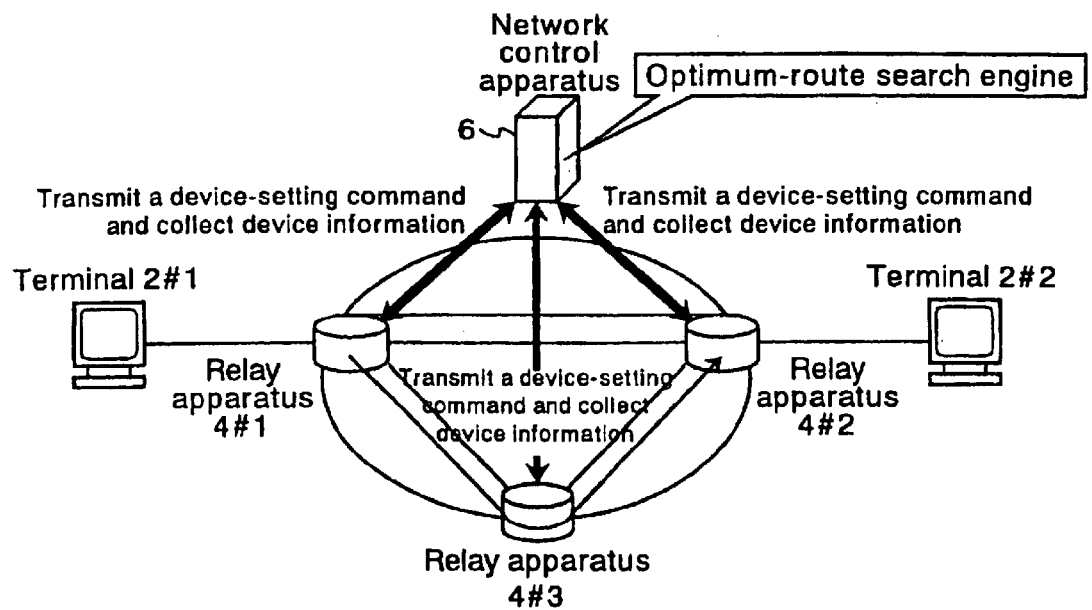
FIG. 43 is a diagram showing the conventional network control apparatus.

FIG. 42 is a flowchart representing details of the step S196 of the flowchart shown in FIG. 41. Since pieces of processing carried out at steps S200 to S202 are the same as those performed at the steps S82 to S84 of the flowchart shown in FIG. 23, it is not necessary to repeat their explanation.

At a step S204, the route-finding unit 134 searches the topology sub-database for devices excluding the relay apparatus in the state of congestion or the state of failure on routes between the address of a start point and the address of an end point specified in the request by using the address of a start point, the address of an end point and the bandwidth specified in the information as search keys. The route-finding unit 134 then stores information on the routes passing through the devices found in the search operation in the route-management sub-database. The results of the search operation are reported to the device-recognizing unit 66. Since pieces of processing carried out at the step S206 to a step S210 are the same as those performed at the steps S88 to S92 of the flowchart shown in FIG. 23, it is not necessary to repeat their explanation.

As a result, the network control apparatus implemented by the fifth embodiment is capable of spontaneously setting new routes not passing through a relay apparatus in a state of congestion or a state of failure. As described above, in addition to the effects provided by the first embodiment, the fifth embodiment is capable of detecting a state of congestion or a state of failure in a relay apparatus and, hence, changing routes automatically to provide a communication network with improved reliability.

In accordance with the embodiments described above, a communication network is divided into a plurality of areas each controlled by a network control apparatus so that the amount of stored communication network information, the magnitude of a processing load to find routes and the number of linked connections in each network control apparatus do not rise even if the scale of the communication network becomes large.

It should be noted that the present invention is not limited to the details of the preferred embodiments described above. That is to say, the scope of the present invention is defined by the appended claims, and all changes and modifications falling within the equivalence of the scope of the claims are therefore to be embraced by the invention.

What is claimed is:

1. A network control apparatus for controlling specific ones among a plurality of devices in a communication network divided into a plurality of areas wherein said specific devices are located in a predetermined one among said areas, said network control apparatus comprising:

request-receiving means for receiving a first route-setting request requesting setting of a route between a device serving as a transmission destination and a device serving as a transmission source receiving communicated data from one of said devices;

a database for storing device information identifying said controlled specific devices located in said predetermined area and topology information indicating a link of each of said specific devices to devices adjacent to said specific device;

request-range-judging means for searching said database for the device serving as a transmission source and the device serving as a transmission destination specified in said first route-setting request and forming a judgment as to whether or not said first route-setting request is relevant to any of said controlled specific devices by determining whether said device serving as transmission source and said device serving as a transmission destination are among said controlled specific devices;

request-transmitting means for transmitting said first route-setting request to an upper-level network control apparatus controlling said network control apparatus in the case of said request-range-judging means' judgment outcome indicating that said first route-setting request is irrelevant to any of said controlled specific devices;

route-finding means for finding a route between said device serving as a transmission destination and said device serving as a transmission source on the basis of said first route-setting request and said topology information in the case of said request-range-judging means' judgment outcome indicating that said first route-setting request is relevant to any of said controlled specific devices;

device-recognizing means for creating a device-setting request relevant to said route found by said request-range-judging means for each device on said route or for each lower-level network control apparatus controlling one of said areas passed through by said route; and request and information-transmitting means for transmitting said device-setting request to each device on said route or each lower-level network control apparatus controlling one of said areas passed through by said route.

2. A network control apparatus according to claim 1, said apparatus further having:

device-information-receiving means for receiving first network information showing links among devices from each of said devices; and device-information-transmitting means, which is used for transmitting network information based on said first network information to an upper-level network control apparatus controlling said network control apparatus if said upper-level network control apparatus exists.

3. A network control apparatus according to claim 2, said apparatus further having device-information-forming means, which is used for forming said network information showing a topology of devices located on a border of said predetermined area on the basis of pieces of said first network information when said pieces of said first network information are received from said devices.

4. A network control apparatus according to claim 3 wherein said device-information-transmitting means transmits first network information formed by said device-information-forming means and second network information, that is, device data for identifying all devices located in said predetermined area.

5. A network control apparatus according to claim 4, said apparatus further having database-updating means for updating said database for storing said device information and said topology information on the basis of said first network information and said second network information.

6. A network control apparatus according to claim 1 wherein said request-range-judging means forms a judgment as to whether said first request for setting of routes has been transmitted by an upper-level network control apparatus controlling said network control apparatus or a device controlled by said network control apparatus and passes on said first request for setting of routes to said route-finding means unconditionally if an outcome of said judgment indicates that said first request for setting of routes has been transmitted by said upper-level network control apparatus.

7. A network control apparatus according to claim 1, said apparatus further having:

a profile database for storing information on access rights; and access-right-determining means for collating a device or a user making said first request for setting of routes with said access rights stored in said profile database to form a judgment as to whether or not said device or said user has an access right, and accepting said first request for setting of routes transmitted by a device or a user judged to have an access right.

8. A network control apparatus according to claim 1, said apparatus further having:

route management means for storing route management information for managing established routes into said database; and setting-process activation means for:

receiving information on status of a device controlled by said network control apparatus;

forming a judgment as to whether or not said device controlled by said network control apparatus is in a state of congestion on the basis of said received information on status;

creating a second request for setting of routes in case an outcome of said judgment indicates that said device controlled by said network control apparatus is in a state of congestion;

searching said route management information stored in said database for a specific route passing through said network control apparatus' controlled device in a state of congestion; and supplying said second request for setting of routes and said specific route to said request-range-judging means, wherein said route-finding means finds routes excluding said specific route.

9. A network control apparatus according to claim 1, said apparatus further having:

route management means for storing route management information for managing established routes into said database; and setting-process activation means for:

receiving information on status of a device controlled by said network control apparatus;

forming a judgment as to whether or not said device controlled by said network control apparatus is in a state of failure on the basis of said received information on status;

creating a second request for setting of routes in case an outcome of said judgment indicates that said device controlled by said network control apparatus is in a state of failure;

searching said route management information stored in said database for a specific route passing through said network control apparatus' controlled device in a state of failure; and supplying said second request for setting of routes and said specific route to said request-range-judging means, wherein said route-finding means finds routes excluding said specific route.

10. A communication network:

comprising a plurality of communication terminals, a plurality of relay apparatuses and a plurality of network control apparatuses; and treating each of said communication terminals, said relay apparatuses and said network control apparatuses like a device, wherein said network control apparatuses form a multi-branch tree structure in which:

each of said network control apparatuses at the lowest level of said multi-branch tree structure controls a plurality of said communication terminals and a plurality of said relay apparatuses located in a predetermined one of a plurality of first areas composing said communication network;

each of said other network control apparatuses controls a plurality of said communication terminals and a plurality of said relay apparatuses located in a second area comprising some of said first areas each controlled by one of said network control apparatuses at said lowest level; and each of said network control apparatuses comprises:

request-receiving means for receiving a first route-setting request requesting setting of a route between a device serving as a transmission destination and a device serving as a transmission source receiving communicated data from one of said devices;

a database for storing device information identifying said controlled specific devices located in said predetermined area and topology information indicating a link of each of said specific devices to devices adjacent to said specific device;

request-range-judging means for searching said database for the device serving as a transmission source and the device serving as a transmission destination specified in said first route-setting request and forming a judgment as to whether or not said first route-setting request is relevant to any of said controlled specific devices by determining whether said device serving as transmission source and said device serving as a transmission destination are among said controlled specific devices;

request-transmitting means for transmitting said first route-setting request to an upper-level network control apparatus controlling said network control apparatus in the case of said request-range-judging means' judgment outcome indicating that said first route-setting request is irrelevant to any of said controlled specific devices;

route-finding means for finding a route between said device serving as a transmission destination and said device serving as a transmission source on the basis of said first route-setting request and said topology information in the case of said request-range-judging means' judgment outcome indicating that said first route-setting request is relevant to any of said controlled specific devices;

device-recognizing means for creating a device-setting request relevant to said route found by said request-range-judging means for each device on said route or for each lower-level network control apparatus controlling one of said areas passed through by said route; and request and information-transmitting means for transmitting said device-setting request to each device on said route or each lower-level network control apparatus controlling one of said areas passed through by said route.

* * * * *